(12) United States Patent
Lang et al.

(10) Patent No.: US 11,742,149 B2
(45) Date of Patent: Aug. 29, 2023

(54) HERMETICALLY SEALED HIGH ENERGY ELECTROLYTIC CAPACITOR AND CAPACITOR ASSEMBLIES WITH IMPROVED SHOCK AND VIBRATION PERFORMANCE

(71) Applicant: Vishay Israel Ltd., Petach Tiqwa (IL)

(72) Inventors: Matthew J. Lang, Milford, CT (US); Andrey Mitiagin, Dimona (IL); Steve Breithaupt, North Bennington, VT (US); Scott Godfrey, Albany, NY (US); Pavel Vaisman, Omer (IL)

(73) Assignee: VISHAY ISRAEL LTD.

( * ) Notice: Subject to any disclaimer, the term of this patent is extended or adjusted under 35 U.S.C. 154(b) by 0 days.

(21) Appl. No.: 17/528,943

(22) Filed: Nov. 17, 2021

(65) Prior Publication Data

US 2023/0154688 A1    May 18, 2023

(51) Int. Cl.
| H01G 9/10 | (2006.01) |
| H01G 9/145 | (2006.01) |
| H01G 9/048 | (2006.01) |

(52) U.S. Cl.
CPC ............ *H01G 9/10* (2013.01); *H01G 9/048* (2013.01); *H01G 9/145* (2013.01)

(58) Field of Classification Search
CPC ........... H01G 9/10; H01G 9/008; H01G 9/048
See application file for complete search history.

(56) References Cited

U.S. PATENT DOCUMENTS

| 2,089,686 A | 8/1937 | Clark et al. |
| 2,686,892 A | 8/1954 | Lilienfeld |
| 2,834,926 A | 5/1958 | Booe |
| 2,871,425 A | 1/1959 | Burnham |
| 2,908,849 A | 10/1959 | Taylor |
| 3,138,746 A | 6/1964 | Burger et al. |
| 3,275,902 A | 9/1966 | McHugh et al. |
| 3,531,693 A | 9/1970 | Buice |
| 3,624,460 A | 11/1971 | Correll |
| 3,956,819 A | 5/1976 | Auger |

(Continued)

FOREIGN PATENT DOCUMENTS

| CA | 2452932 A1 | 6/2004 |
| CN | 101496197 A | 7/2009 |

(Continued)

OTHER PUBLICATIONS

"New EP1 Wet Tantalum Capacitor Offers Industry-High Capacitance, Design Flexibility for Military and Avionics Systems," Vishay New Product Information, Sep. 2017 (2 pages).

(Continued)

*Primary Examiner* — Eric W Thomas
(74) *Attorney, Agent, or Firm* — Volpe Koenig

(57) ABSTRACT

A capacitor and capacitor assemblies are provided, configured to prevent damage from shock and/or vibration. A capacitor assembly according to the invention comprises an anode plate having an anode plate wire extending from a surface of the anode plate. An anode wire holder is positioned around at least a portion of the anode plate wire. A wire separator comprising a channel is provided, at least a portion of the anode plate wire received within the channel. Methods of forming capacitors and capacitor assemblies are also provided.

13 Claims, 18 Drawing Sheets

(56) References Cited

U.S. PATENT DOCUMENTS

| | | |
|---|---|---|
| 3,976,922 A | 8/1976 | Peck et al. |
| 4,245,275 A | 1/1981 | Cannon |
| 4,377,404 A | 3/1983 | Hoshikawa et al. |
| 4,523,255 A | 6/1985 | Rogers |
| 4,546,415 A | 10/1985 | Kent et al. |
| 4,780,797 A | 10/1988 | Libby |
| 4,942,500 A | 7/1990 | Libby et al. |
| 4,987,519 A | 1/1991 | Hutchins et al. |
| 5,001,607 A | 3/1991 | Breithaupt |
| 5,043,849 A | 8/1991 | Libby |
| 5,105,341 A | 4/1992 | Stephenson et al. |
| 5,131,388 A | 7/1992 | Pless et al. |
| 5,245,513 A | 9/1993 | Maijers et al. |
| 5,288,566 A | 2/1994 | Ginatta et al. |
| 5,334,219 A | 8/1994 | Kroll |
| 5,338,472 A | 8/1994 | Yokoyama et al. |
| 5,369,547 A | 11/1994 | Evans |
| 5,391,186 A | 2/1995 | Kroll et al. |
| 5,437,941 A | 8/1995 | Arledge et al. |
| 5,454,147 A | 10/1995 | Kobayashi et al. |
| 5,469,325 A | 11/1995 | Evans |
| 5,507,966 A | 4/1996 | Liu |
| 5,522,851 A | 6/1996 | Fayram |
| 5,607,454 A | 3/1997 | Cameron et al. |
| 5,621,608 A | 4/1997 | Arai et al. |
| 5,673,168 A | 9/1997 | Efford et al. |
| 5,801,917 A | 9/1998 | Elias |
| 5,894,403 A | 4/1999 | Shah et al. |
| 5,926,362 A | 7/1999 | Muffoletto et al. |
| 5,959,830 A | 9/1999 | Inagawa et al. |
| 5,982,609 A | 11/1999 | Evans |
| 6,146,786 A | 11/2000 | Stadnick et al. |
| 6,157,531 A | 12/2000 | Breyen et al. |
| 6,197,184 B1 | 3/2001 | Hemphill et al. |
| 6,231,993 B1 | 5/2001 | Stephenson et al. |
| 6,238,444 B1 | 5/2001 | Cadwallader |
| 6,334,879 B1 | 1/2002 | Muffoletto et al. |
| 6,380,577 B1 | 4/2002 | Cadwallader |
| 6,400,554 B1 | 6/2002 | Shiraishi et al. |
| 6,509,588 B1 | 1/2003 | O'Phelan et al. |
| 6,522,524 B1 | 2/2003 | Feger et al. |
| 6,560,089 B2 | 5/2003 | Miltich et al. |
| 6,571,126 B1 | 5/2003 | O'Phelan et al. |
| 6,586,134 B2 | 7/2003 | Skoumpris |
| 6,594,140 B1 | 7/2003 | Evans et al. |
| 6,678,559 B1 | 1/2004 | Breyen et al. |
| 6,687,118 B1 | 2/2004 | O'Phelan et al. |
| 6,707,660 B1 | 3/2004 | Evans et al. |
| 6,791,821 B1 | 9/2004 | Monnett |
| 6,801,424 B1 | 10/2004 | Nielsen et al. |
| 6,807,048 B1 | 10/2004 | Nielson et al. |
| 6,819,544 B1 | 11/2004 | Nielsen et al. |
| 6,850,405 B1 | 2/2005 | Mileham et al. |
| 6,859,353 B2 | 2/2005 | Elliott et al. |
| 6,875,318 B1 | 4/2005 | Gabriele et al. |
| 6,946,220 B2 | 9/2005 | Probst et al. |
| 6,952,339 B1 | 10/2005 | Knowles |
| 6,957,103 B2 | 10/2005 | Schmidt et al. |
| 7,012,799 B2 | 3/2006 | Muffoletto et al. |
| 7,038,901 B2 | 5/2006 | Muffoletto et al. |
| 7,072,171 B1 | 7/2006 | Muffoletto et al. |
| 7,085,126 B2 | 8/2006 | Muffoletto et al. |
| 7,092,242 B1 | 8/2006 | Gloss et al. |
| 7,118,828 B2 | 10/2006 | Dodd et al. |
| 7,164,574 B2 | 1/2007 | Barr et al. |
| 7,169,284 B1 | 1/2007 | Jiang et al. |
| 7,271,994 B2 | 9/2007 | Stemen et al. |
| 7,274,551 B1 | 9/2007 | Parler, Jr. et al. |
| 7,355,840 B2 | 4/2008 | Doffing et al. |
| 7,419,873 B2 | 9/2008 | Doffing et al. |
| 7,483,260 B2 | 1/2009 | Ziarniak et al. |
| 7,531,010 B1 | 5/2009 | Feger et al. |
| 7,705,110 B2 | 4/2010 | Anderson |
| 7,710,713 B2 | 5/2010 | Restorff et al. |
| 7,715,174 B1 | 5/2010 | Beauvais et al. |
| 7,733,631 B2 | 6/2010 | Brabeck et al. |
| 7,813,107 B1 | 10/2010 | Druding et al. |
| 7,983,022 B2 | 7/2011 | O'Connor et al. |
| 8,086,312 B2 | 12/2011 | Nielsen et al. |
| 8,238,079 B1 | 8/2012 | Knowles |
| 8,259,435 B2 | 9/2012 | Millman et al. |
| 8,339,769 B2 | 12/2012 | Schott et al. |
| 8,405,956 B2 | 3/2013 | Dressig et al. |
| 8,451,586 B2 | 5/2013 | Priban |
| 8,477,479 B2 | 7/2013 | Pease et al. |
| 8,576,544 B2 | 11/2013 | Rawal et al. |
| 8,605,411 B2 | 12/2013 | Biler et al. |
| 8,687,347 B2 | 4/2014 | Bates et al. |
| 9,070,512 B2 | 6/2015 | Breithaupt et al. |
| 9,076,592 B2 | 7/2015 | Masheder et al. |
| 9,105,401 B2 | 8/2015 | Dreissig et al. |
| 9,737,724 B2 | 8/2017 | Eidelman et al. |
| 9,859,065 B1 | 1/2018 | Lim et al. |
| 9,947,479 B2 | 4/2018 | Eidelman et al. |
| 10,176,930 B2 | 1/2019 | Eidelman et al. |
| 10,614,963 B2 | 4/2020 | Eidelman et al. |
| 11,189,431 B2 | 11/2021 | Eidelman et al. |
| 2003/0011967 A1 | 1/2003 | Nielsen et al. |
| 2003/0088293 A1 | 5/2003 | Clarke et al. |
| 2004/0120099 A1 | 6/2004 | Elliott et al. |
| 2004/0127952 A1 | 7/2004 | O'Phelan et al. |
| 2004/0195093 A1 | 10/2004 | Cohen et al. |
| 2004/0225327 A1 | 11/2004 | Norton et al. |
| 2004/0240149 A1 | 12/2004 | Lessner et al. |
| 2005/0077342 A1 | 4/2005 | Chen et al. |
| 2005/0177193 A1 | 8/2005 | Nielsen et al. |
| 2005/0180094 A1 | 8/2005 | Muffoletto et al. |
| 2005/0195558 A1 | 9/2005 | Goldberger et al. |
| 2005/0219787 A1 | 10/2005 | Stevenson et al. |
| 2005/0264979 A1 | 12/2005 | Breyen et al. |
| 2006/0012945 A1 | 1/2006 | Doffing et al. |
| 2006/0018079 A1 | 1/2006 | Barr et al. |
| 2006/0023400 A1 | 2/2006 | Sherwood |
| 2006/0279906 A1 | 12/2006 | Stemen et al. |
| 2006/0279907 A1 | 12/2006 | Doffing et al. |
| 2006/0291140 A1 | 12/2006 | Kazaryan et al. |
| 2007/0211412 A1 | 9/2007 | Fife et al. |
| 2007/0211413 A1 | 9/2007 | Fife et al. |
| 2008/0026286 A1 | 1/2008 | Cui et al. |
| 2008/0068779 A1 | 3/2008 | Restorff et al. |
| 2008/0151474 A1 | 6/2008 | Ziarniak et al. |
| 2008/0170353 A1 | 7/2008 | Swanson |
| 2008/0232029 A1 | 9/2008 | Ning |
| 2008/0232030 A1 | 9/2008 | Jones et al. |
| 2008/0232032 A1 | 9/2008 | Jones et al. |
| 2008/0247122 A1 | 10/2008 | Vaisman et al. |
| 2009/0073638 A1 | 3/2009 | Fujii et al. |
| 2009/0273885 A1 | 11/2009 | Jiang et al. |
| 2010/0134955 A1 | 6/2010 | O'Connor et al. |
| 2010/0175235 A1 | 7/2010 | Nielsen et al. |
| 2010/0268292 A1 | 10/2010 | Eidelman et al. |
| 2010/0297495 A1 | 11/2010 | Casby et al. |
| 2010/0318142 A1 | 12/2010 | Chen |
| 2012/0087062 A1 | 4/2012 | Kurita |
| 2012/0106029 A1 | 5/2012 | Galvagal |
| 2012/0127632 A1 | 5/2012 | Evans et al. |
| 2012/0179217 A1 | 7/2012 | Bates et al. |
| 2012/0257327 A1 | 10/2012 | Zednickova et al. |
| 2013/0095299 A1 | 4/2013 | Evans |
| 2014/0104755 A1 | 4/2014 | Hagiwara et al. |
| 2014/0268499 A1 | 9/2014 | O'Phelan et al. |
| 2015/0127060 A1 | 5/2015 | Eidelman et al. |
| 2015/0179349 A1 | 6/2015 | Biler et al. |
| 2016/0189876 A1 | 6/2016 | Djebara et al. |
| 2016/0336115 A1 | 11/2016 | Kaiser et al. |
| 2017/0125178 A1* | 5/2017 | Perez ............... H01G 9/08 |
| 2017/0140876 A1 | 5/2017 | Eidelman et al. |
| 2017/0148576 A1 | 5/2017 | Hahl et al. |
| 2017/0207031 A1 | 6/2017 | Eidelman et al. |
| 2020/0020486 A1 | 1/2020 | Eidelman et al. |

(56) References Cited

U.S. PATENT DOCUMENTS

| | | | |
|---|---|---|---|
| 2020/0075264 A1* | 3/2020 | Eidelman | H01G 9/08 |
| 2022/0208478 A1* | 6/2022 | Perez | H01G 9/008 |

FOREIGN PATENT DOCUMENTS

| | | | |
|---|---|---|---|
| CN | 113363077 A * | 9/2021 | |
| EP | 0491178 A1 | 6/1992 | |
| EP | 1053763 A2 | 11/2000 | |
| GB | 760761 | 11/1956 | |
| GB | 794631 | 5/1958 | |
| GB | 1055362 | 1/1964 | |
| GB | 2036432 | 6/1980 | |
| JP | 56-169534 U | 12/1981 | |
| JP | 02-280310 A | 11/1990 | |
| JP | 3-41921 U | 4/1991 | |
| JP | 05-234814 A | 9/1993 | |
| JP | 09-326327 A | 12/1997 | |
| JP | 10163076 A * | 6/1998 | |
| JP | 2015035454 A * | 2/2015 | |
| WO | 94/00193 A1 | 1/1994 | |
| WO | 01/57928 A1 | 8/2001 | |
| WO | 2004/049361 A1 | 6/2004 | |
| WO | 2005/001997 A1 | 1/2005 | |
| WO | 2008/084314 A1 | 7/2008 | |
| WO | 2010/121018 A1 | 10/2010 | |

OTHER PUBLICATIONS

"Wet Tantalum Capacitors, High Energy, Ultra High Capacitance, −55° C. to +125° C. Operation," Vishay Datasheet, Document No. 42107, Jun. 19, 2017 (8 pages).

"Wet Tantalum Capacitors, High Energy, Ultra High Capacitance, −55° C. to +125° C. Operation" Vishay Product Sheet, 2017 (2 pages).

* cited by examiner

HERMETICALLY SEALED HIGH ENERGY ELECTROLYTIC CAPACITOR AND CAPACITOR ASSEMBLIES WITH IMPROVED SHOCK AND VIBRATION PERFORMANCE

FIELD OF INVENTION

This application relates to the field of electronic components, and more specifically, to capacitors and capacitor assemblies.

BACKGROUND

Wet capacitors are used in the design of circuits due to their volumetric efficiency, stable electrical parameters, high reliability and long service life. Such capacitors typically have a larger capacitance per unit volume than certain other types of capacitors, making them valuable in high-current, high-power, and low-frequency electrical circuits. One type of wet capacitor is a wet electrolytic capacitor. A wet electrolytic capacitor includes two conducting surfaces (an anode and a cathode) whose function is to store electrical charge, and a fluid electrolyte. An insulating material or dielectric separates the two conducting surfaces. Wet electrolytic capacitors tend to offer a good combination of high capacitance and low leakage current.

Wet electrolytic capacitors are basic to various types of electrical equipment from satellites, aerospace, airborne, military group support, oil exploration, power supplies, and the like. In any of these example applications, the capacitor may be exposed to harsh environmental conditions, including extreme temperatures, pressure, moisture, shock, vibration, and the like.

The capacitor must be able to withstand these harsh environmental conditions while maintaining its accuracy, service life, and ability to be powered at very high temperatures with no maintenance. Failure of a capacitor due to harsh environmental conditions would necessitate its removal for repairs, which would result in delays and other associated expenses. Additionally, many of these example applications include significant dimensional or layout constraints, as the field of electronics is consistently demanding smaller parts and devices. For example, reductions in both mounting area and component profile (i.e., height) are highly demanded in most current applications.

Known wet electrolytic capacitors, such as Tantalum (Ta) electrolytic capacitors, are generally characterized as having a cylindrical shape and axial leaded terminations. Tantalum electrolytic capacitors known in the art may use tantalum for the anode material. The tantalum anode body (also commonly referred to as a "slug" or "pellet") is usually sintered. A wire (which may also be formed of tantalum) is commonly formed in the anode body in one of two ways: (1) "embedded," meaning the wire is encased in tantalum powder during a pressing process; or (2) "welded," meaning after the pellet is pressed and sintered, the wire is welded to the tantalum anode body. The other end of the wire extends outside of the tantalum anode body. The capacitor dielectric material made by anodic oxidation of the anode material to form an oxide layer over the surface of the anode body (e.g., Ta to $Ta_2O_5$). A capacitor cathode may be formed by coating an inner surface of the body or case of the capacitor that encloses the tantalum anode body. The cathode may be formed of sintered tantalum or electrophoretically deposited tantalum or any other method known in the art, and coupled to a cathode terminal. The cathode may be formed of sintered tantalum, electrophoretically deposited tantalum, graphite, palladium, Ruthenium(IV) oxide (RuO2) or any other acceptable materials known in the art, and coupled to a cathode terminal. A fluid electrolyte separates the cathode and the anode body and provides for electrical communication between the cathode and anode body. Although cylindrical shaped capacitors with axial leaded terminations generally perform reliably in harsh environmental conditions, their provided energy density is limited by their cylindrical shape and limited surface area of their surfaces (anode and cathode), as the surface area of the two surfaces determines the capacitance of the capacitor. Additionally, dimensional constraints often make their application difficult.

Other types of known wet electrolytic capacitors are characterized as having a circular or square shaped capacitor body or "can" with radial leaded terminations. While circular or square shaped capacitors with radial leaded terminations may provide higher energy density when compared to cylindrical shaped capacitors with axial leaded terminations, their ability to operate in harsh environmental conditions is limited. Additionally, circular or square shaped capacitors with radial leaded terminations generally have limited ability to survive in high shock or vibration environments.

Known wet electrolytic capacitors may have anode wires that are not secured within the capacitor case, can or body. In addition, known wet electrolytic capacitors do not have internal arrangements or components that are configured to secure the anode wires and thereby account for, compensate for, diminish and/or or lessen or prevent damage from shock, high frequency, and vibration.

For example, known wet electrolytic capacitors may be used in connection with high energy products. Such products may have difficulty accounting for, by way of example, shock, high-frequency vibration, and random vibration without any damage to the electrical parameters of such products. The capacitors of such products may move, as they are not firmly clamped or secured. This anode movement may lead to anode wire breakage and/or scratches or abrasions to dielectric surfaces of the anodes which may increase the direct leakage current (DCL).

At present, therefore, a need exists for an improved wet electrolytic capacitor capable which is configured to account for, compensate for, and/or or lessen or prevent shock, high frequency, and vibration.

There further exists a need for an improved wet electrolytic capacitor capable of operating in harsh environmental conditions characterized with a low profile to comply with common dimensional constraints.

SUMMARY

Capacitor assemblies are provided having increased resistance to shock, high-frequency vibration, and movement.

According to an aspect of the invention, a capacitor assembly is provided comprising a case comprising walls defining an interior area and a cover. A plurality of anode plates are provided in the interior area. Each anode plate includes an anode plate wire, having a first portion embedded in the anode plate, and a second portion extending from a wall of the anode plate. At least a portion of the second portion of each anode plate wire is surrounded by an anode wire holder. Each anode wire holder is positioned in a cavity provided between a wall of each anode plate and an inner surface of a wall of the case.

According to an aspect of the invention, a wire separator is provided in the interior area, adjacent the cover. The wire separator comprises channels for receiving and guiding portions of the second portions of the anode plate wires.

According to an aspect of the invention, an adapter plate is provided on the wire separator. The adapter plate may be received within a recess in the wire separator shaped to receive the adapter plate. The ends of the anode plate wires are electrically connected to the adapter plate.

According to an aspect of the invention, a gasket may be provided adjacent the wire separator within the interior area of the case.

According to an aspect of the invention, a glass-to-metal-seal (GTMS) is provided in the cover. An anode lead wire extends through the glass-to-metal-seal (GTMS) to the interior area of the case. A spacer plate may be provided covering a glass insert of the glass-to-metal-seal (GTMS). The spacer plate may be received in an opening in the wire separator, and positioned adjacent the adapter plate. The anode lead wire may extend through the spacer plate and connect to the adapter plate.

According to an aspect of the invention, a plurality of cathode assemblies may be provided. At least some of the cathode assemblies may be positioned between adjacent anode plates. The cathode assemblies may each comprise a cathode foil held between cathode separator sheets. Cathode extensions or tabs may be provided in electrical communication with the cathode foils. The tabs are in electrical communication with the case. The case may further comprise an external cathode lead.

According to an aspect of the invention, a fluid electrolyte is introduced into the interior area of the case such as through a fill port through the cover, and a plug is inserted to close the fill port.

According to an aspect of the invention, a capacitor assembly may comprise an anode plate having an anode plate wire extending from a surface of the anode plate. An anode wire holder is positioned around at least a portion of the anode plate wire. A wire separator comprising a channel is provided, at least a portion of the anode plate wire received within the channel. The capacitor assembly may further comprise a case defining an interior area, with the anode plate, the anode plate wire, and the wire separator positioned within the interior area. The anode wire holder is positioned between a wall of the anode plate and an inner surface of a wall of the case. The wire separator may further comprise a recessed area, and an adapter plate may be provided positioned within the recessed area. At least a portion of the anode plate wire is attached to the adapter plate. The case may comprise a cover. A glass-to-metal-seal (GTMS) may be provided in the cover, further comprising an anode lead wire positioned through the glass-to-metal-seal (GTMS). The anode lead wire is in electrical contact with the adapter plate. The anode wire holder may comprise a tube. The anode wire holder may contact the wall of the anode plate at a first position, and contacts the inner wall of the case at a second position. At least one cathode assembly may be positioned within the interior area adjacent to the anode plate and insulated from the anode plate, the cathode assembly in electrical communication with the case.

According to an aspect of the invention, a capacitor may comprise a case defining an interior area, the case comprising a cover. A plurality of anode plates may be arranged in a stack, with each of the plurality of anode plates comprising an anode plate wire. Each of the plurality of anode plate wires is surrounded by an anode wire holder. The anode wire holders may be positioned between the plurality of anode plate members and an inner surface of the case. The plurality of anode plates, the anode plate wires, and the anode wire holders are positioned within the interior area. A plurality of cathode assemblies may be positioned within the interior area and insulated from the plurality of anode plates. At least some of the plurality of cathode assemblies are positioned between adjacent anode plates. The plurality of cathode assemblies are in electrical communication with the case. A wire separator is provided positioned in the interior area and comprising a plurality of channels. At least a portion of each of the anode plate wires are received within one of the plurality of channels. An adapter plate is provided positioned on the wire separator. At least a portion of each of the anode plate wires is attached to the adapter plate. An anode lead wire is provided extending through the case and isolated from the case. The anode lead wire is in electrical contact with the adapter plate. A fluid electrolyte is contained within the body.

According to an aspect of the invention, a method of forming a cathode assembly. The method comprises: forming an anode plate; forming an anode plate wire extending from a surface of the anode plate; surrounding at least a portion of the anode plate with an anode wire holder; forming a wire separator positioned within the interior area, the wire separator comprising a channel; and positioning at least a portion of the anode plate wire within the channel.

These and other objects and advantages of the present invention will be recognized by one skilled in the art after having read the following detailed description, which are illustrated in the various drawing figures.

BRIEF DESCRIPTION OF THE DRAWINGS

A more detailed understanding may be had from the following description, given by way of example in conjunction with the accompanying drawings wherein.

DETAILED DESCRIPTION

Figure 1A:
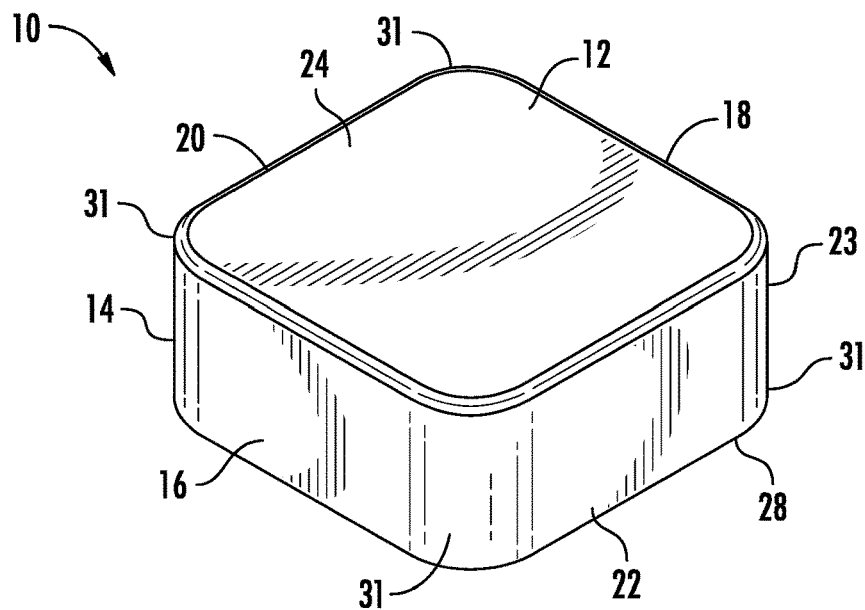
FIG. 1A shows a perspective view of the top of an example of a capacitor according to aspects of the invention.

Reference will now be made in detail to various aspects and/or embodiments of the invention, examples of which are illustrated in the accompanying drawings. While the invention will be described in conjunction with these aspects and/or embodiments, it is understood that they are not intended to limit the invention to these aspects and/or embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Certain terminology is used in the following description for convenience only and is not limiting. The words "right," "left," "top," "bottom," "upper," and/or "lower" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B, or C, as well as any combination thereof.

FIGS. 1A-2A illustrate an example of a capacitor 10 according to an aspect of the invention, which may also be referred to as a "device" or "component." Various arrangements of component parts or sub-assemblies of the capacitor 10 assembled according to aspects of the invention may be referred to each as a "capacitor assembly," or together as "capacitor assemblies."

The capacitor 10 is preferably a self-contained unit housing a plurality of plate members that are stacked with one another and filled with an electrolyte fluid. The outer arrangement of the capacitor 10 can be seen in FIGS. 1A-2A. As shown in FIGS. 1A-2A, the capacitor 10 includes a case 12 which may also be referred to as a "body." The case 12 may have an overall generally rectangular shape, although other shapes, including square, circular, and oblong, are also contemplated. The case 12 may generally include a first surface 24 (or "top" or "upper surface" or "upper side") as shown in the orientation of the capacitor 10 in the Figures, although the capacitor may be mounted in a different orientation in use. The case 12 may generally include a wall 14 extending downwardly from the first surface 24, thereby forming sides or sidewalls of the case 12. The wall 14 is preferably a continuous component or uninterrupted wall. In a generally rectangular arrangement, the wall 14 may comprise a first side 16, and opposite second side 18, a third side 20 extending between the first side 16 and the second side 18, and an opposite fourth side 22 extending between the first side 16 and the second side 18. The case comprises a conductive metal such as tantalum and/or another suitable material, such as niobium, titanium, or alloys of those. The case 12 may have corner areas 31, as shown.

A first portion 23 of the case 12 includes the first surface and the extending wall 14, and may be generally formed having an initially open end 28 opposite the first surface 24 that is covered by a cover 30. The cover 30 is provided covering and extending across the open end 28, and forming a second surface 26 (or "lower surface" or "bottom surface" or "lower side") of the case 12. The cover 30 may comprise a conductive metal such as tantalum and/or another suitable material, such as niobium, titanium, or alloys of those. The case 12 including the cover 30 thus form or define an interior area 32 configured to house internal components of the capacitor 10. The cover 30 may be welded to the wall 14 to seal the case 12. The case 12 may sometimes be referred to as a "body" or "can." The case 12 may include an extended edge 29 that is adjacent to an extended edge 33 of the cover 30, as shown.

Figure 1B:
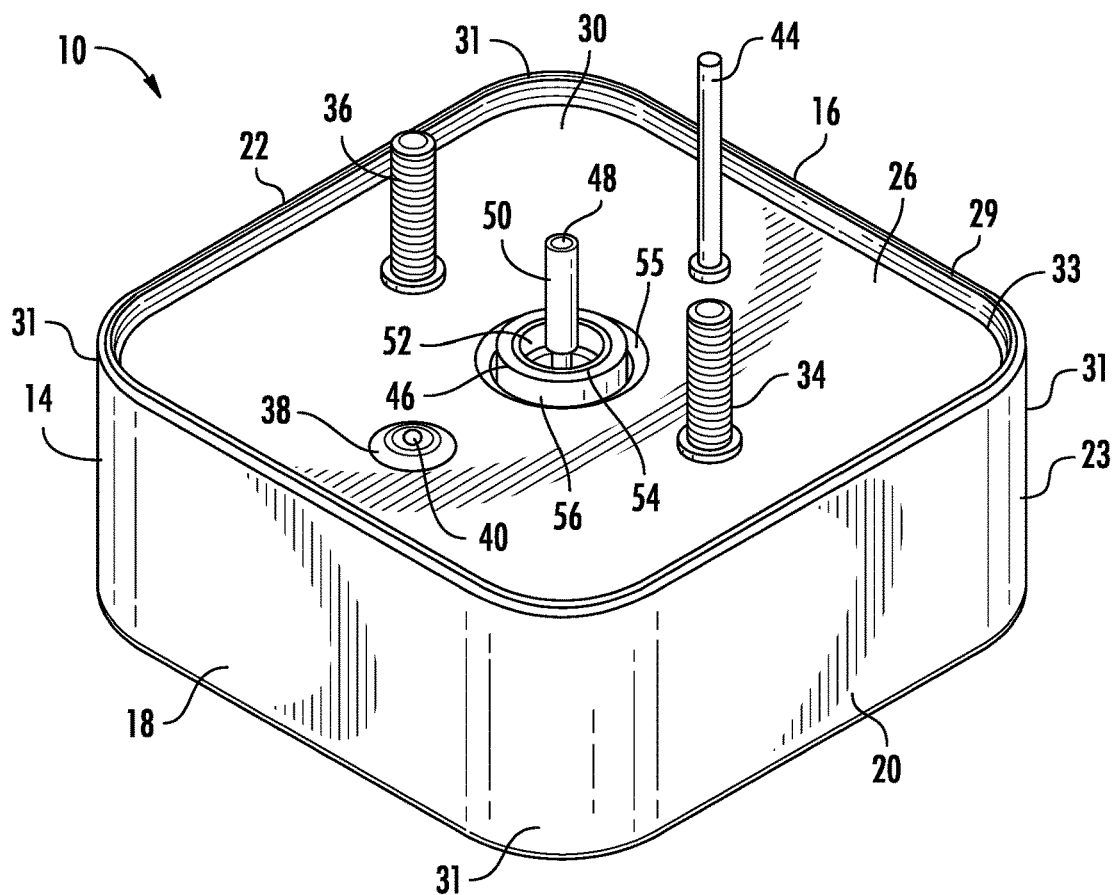
FIG. 1B shows a perspective view of the bottom of the capacitor of FIG. 1A.
Figure 1C:
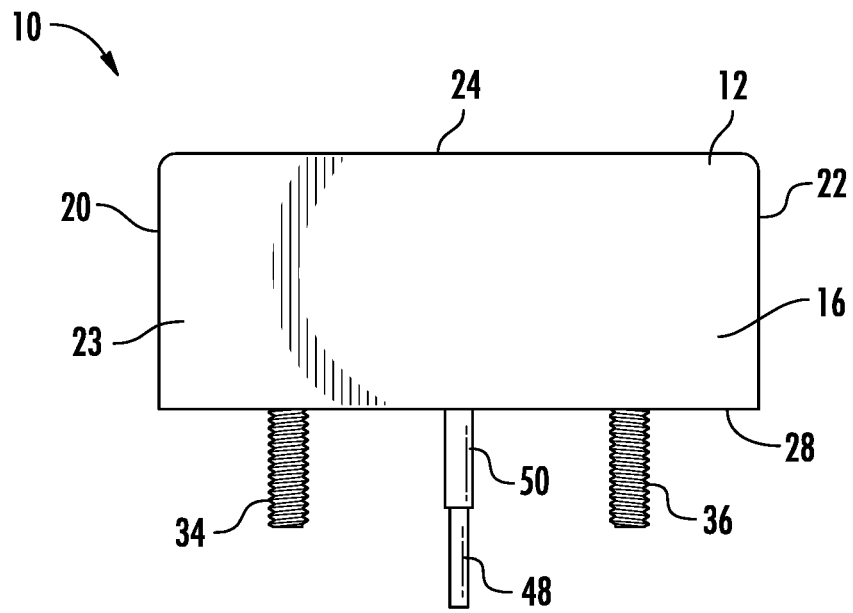
FIG. 1C shows a side view of the capacitor of FIGS. 1A and 1B.
Figure 1D:
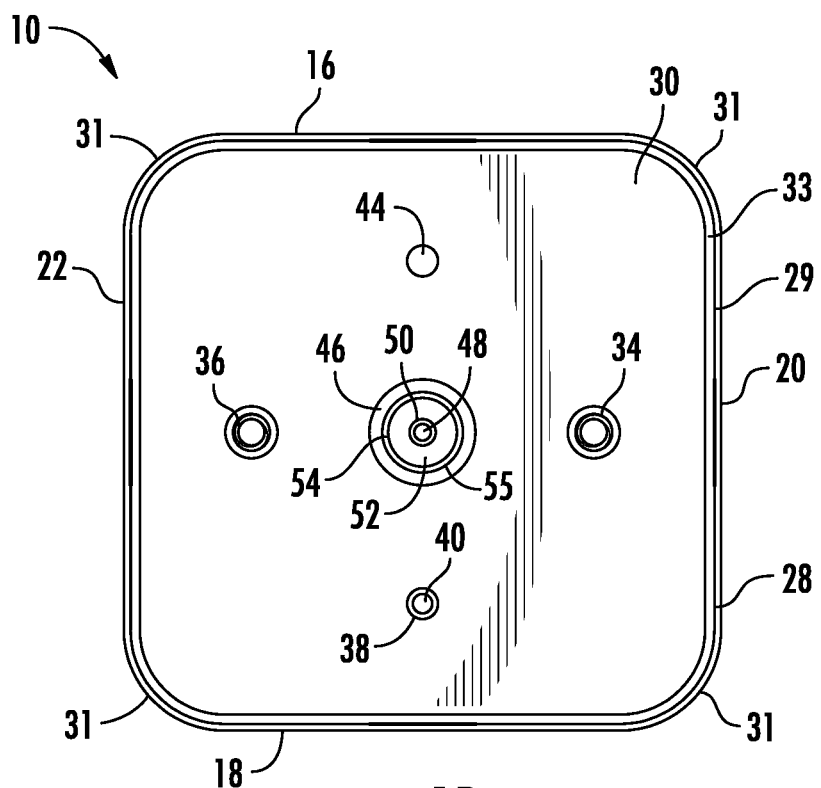
FIG. 1D shows bottom view of the capacitor of FIGS. 1A, 1B and 1C.

As shown for example in FIGS. 1B and 1D, the cover 30 may include mounting elements formed as an extending first screw weld stud 34 and an extending second screw weld stud 36. These may be employed to secure the case 12 to a mounting surface. A fill port 38 may be provided through the cover 30, allowing for the introduction of a fluid electrolyte. The fill port 38 may be positioned through the wall 14 or top surface 24 in other contemplated arrangements. The fill port 38 may be sealed using a plug 40 and/or a tantalum ball. A cathode lead 44 may be provided as a pin or post extending from or otherwise attached to or welded to the cover 30.

As shown for example in FIGS. 1B and 1D, the cover 30 is further preferably provided with a glass-to-metal-seal (GTMS) 46. The glass-to-metal-seal (GTMS) 46 preferably includes an anode lead wire 48 therethrough that will form the external anode connection for the capacitor 10. The anode lead wire 48 is generally formed from tantalum. An anode lead tube 50, which may be formed from nickel, nickel alloy, or any other solderable material, or another conductive metal, coaxially surrounds and electrically, directly contacts the anode lead wire 48. A performed glass insert 52 formed from a pressed glass surrounds the anode lead tube 50, insulating and isolating the anode lead wire 48 and the anode lead tube 50 from the case 12. A portion of the cover is formed, such as by punching or stamping, as an extended lip 54 or annular wall surrounding the glass insert 52. A compression seal 56 formed from stainless steel may be provided surrounding the lip 54 and sealing the glass-to-metal-seal (GTMS) 46 in place. The glass-to-metal-seal (GTMS) 46 acts to isolate the anode lead wire 48 from the case 12.

In the area surrounding an outer perimeter of the extended lip 54, the cover may have a recessed area 55, having portions extending toward the interior of the case 12. The compression seal 56 may be positioned in the recessed area 55, thereby allowing the compression seal 56 to rest in the recessed area and not extend beyond overall capacitor height.

The case 12 may be formed of tantalum and/or any other suitable type of conductive material such as a metal. The wall 14 and the cover 30 are preferably hermetically welded together to form an enclosure or interior area of the capacitor 10.

A capacitor according to aspects of the invention preferably includes various internal components configured to provide improved shock and vibration resistance, as will be described in further detail.

FIGS. 2B-2D, and 3-9D show examples of anode plates, or anode plate members, or simply anodes, generally referenced as 58. In an example of a capacitor having multiple anode plates 58, a capacitor according to an aspect of the invention may include three anode plates, shown as a first anode plate 58a, a second anode plate 58b, and a third anode plate 58c, in FIGS. 2B-2D and 3-8A. Thus, a capacitor 10 according to an aspect of the invention provided a multi-anode plate arrangement.

The anode plates 58 may be formed using sintered tantalum powder. An anode of sintered tantalum powder is sometimes referred to in the relevant art as an anode "pellet" or "slug." Such anode of sintered tantalum powder forms a porous "slug" with a large surface area. An oxide layer may form over the surface of the anode plates 58 to function as an anode of the capacitor 10. A dielectric layer may be formed on the anode plates 58 by an anodization process, whereby anodic oxidation of the anode material may form an oxide layer over the surface, and preferably the entire surface, of the anode plates 58.

Each anode plate 58 may be formed having a generally rectangular shape as shown in FIGS. 3-9D. Each anode plate 58, may include a first, top or upper surface generally designated as 60, and a second, bottom or lower surface generally designated as 62.

Each anode plate 58 further includes a perimeter wall generally designated as 64. Each side of the perimeter wall 64 preferably includes an indentation generally designated as 66. The indentations 66 provide a decreased diameter portion of the anode plates 58. Each anode plate 58 further preferably includes a cut-out or angled or sloped or beveled corner portion generally designated as 68. These corner portions 68 provide a decreased diameter portion of the anode plates 58, allowing for the passage of anode plate wires 70 as further described.

Figure 2A:
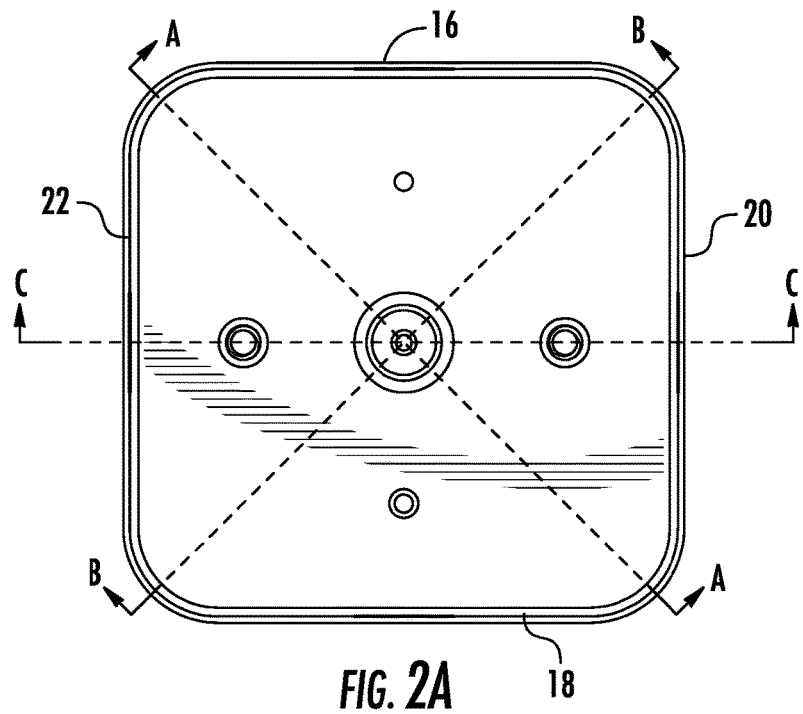
FIG. 2A shows a bottom view of a capacitor according to aspects of the invention.
Figure 2B:
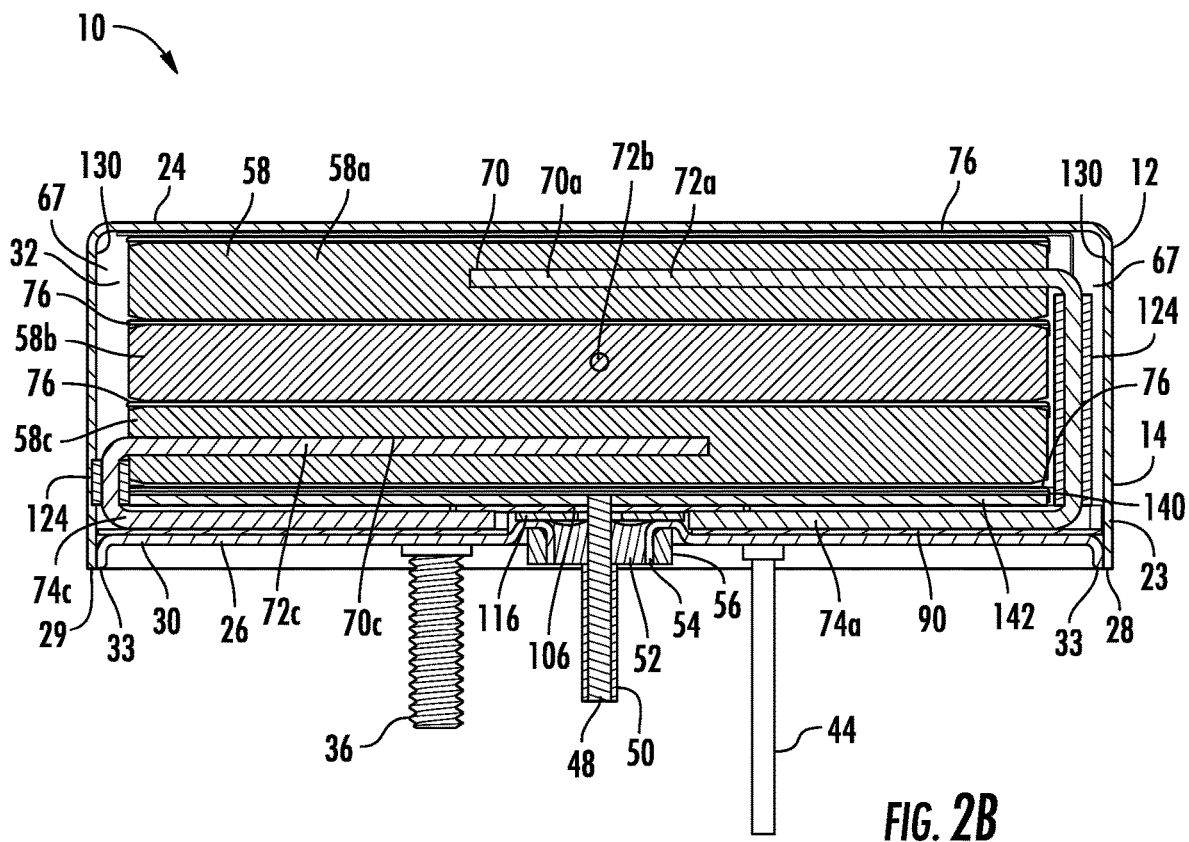
FIG. 2B shows a cross-sectional view of the capacitor of FIG. 2A, taken along line B-B of FIG. 2A.
Figure 2C:
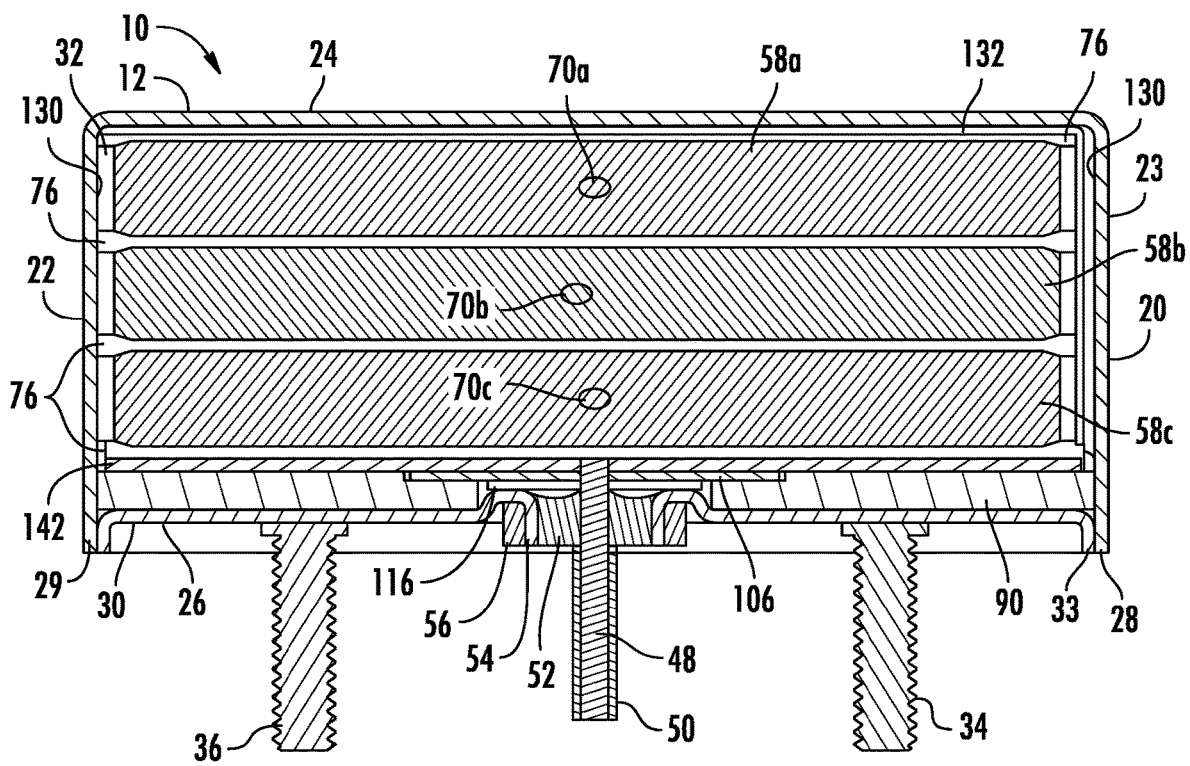
FIG. 2C shows a cross-sectional view of the capacitor of FIG. 2B, taken along line C-C of FIG. 2A.
Figure 2D:
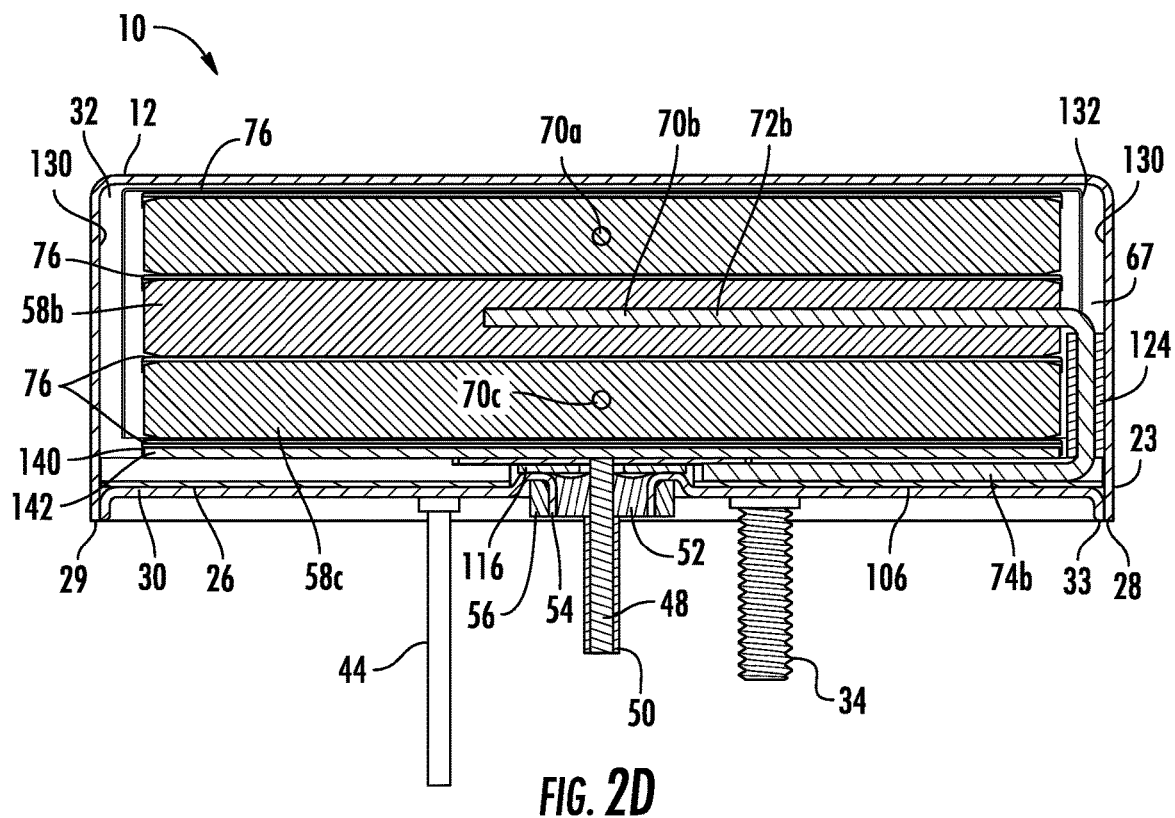
FIG. 2D shows a cross-sectional view of the capacitor of FIG. 2B, taken along line A-A of FIG. 2A.
Figure 3:
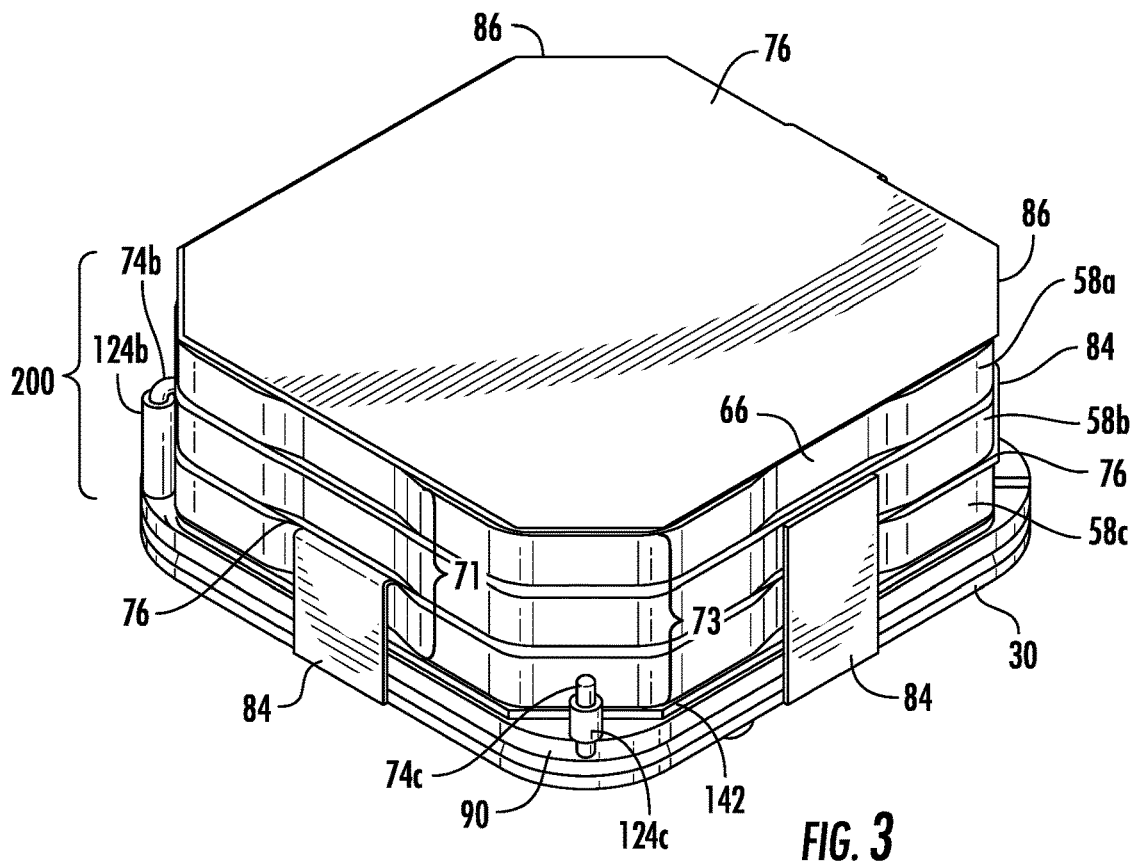
FIG. 3 shows an example of an internal arrangement of a capacitor according to an aspect of the invention, showing anode plates, a wire separator, and a cover, from a top perspective view.
Figure 4:
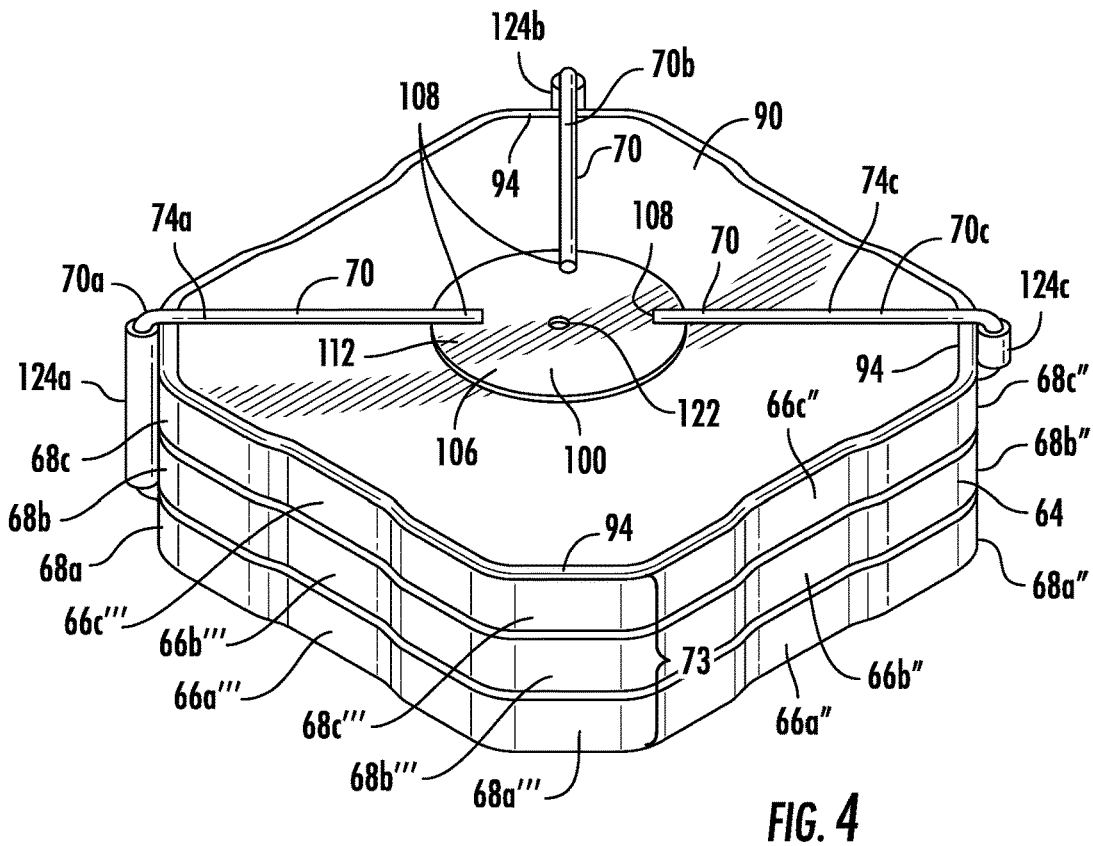
FIG. 4 shows an example of an internal arrangement of a capacitor according to an aspect of the invention, showing anode plate, cathode assemblies, and a wire separator, from a bottom perspective view.
Figure 5:
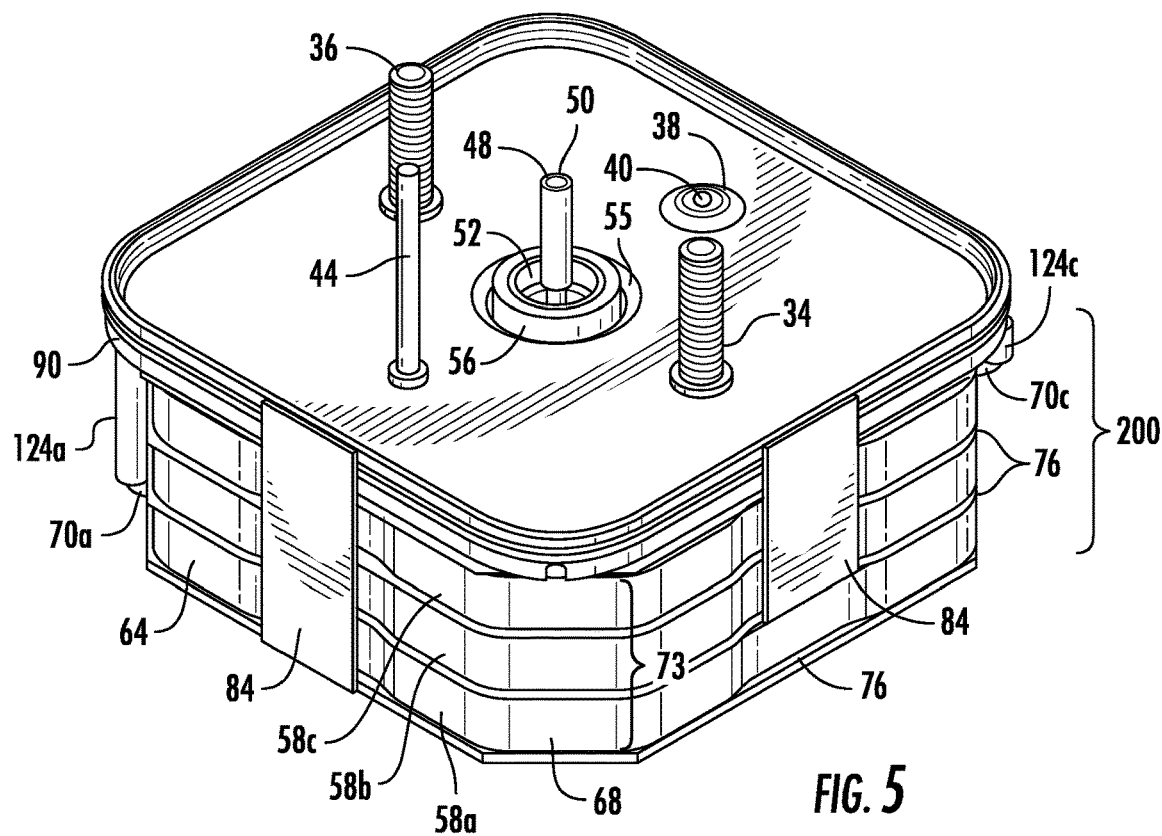
FIG. 5 shows an example of an internal arrangement of a capacitor according to an aspect of the invention, showing anode plate members, cathode assemblies, a wire separator, and a cover from a bottom perspective view.
Figure 6:
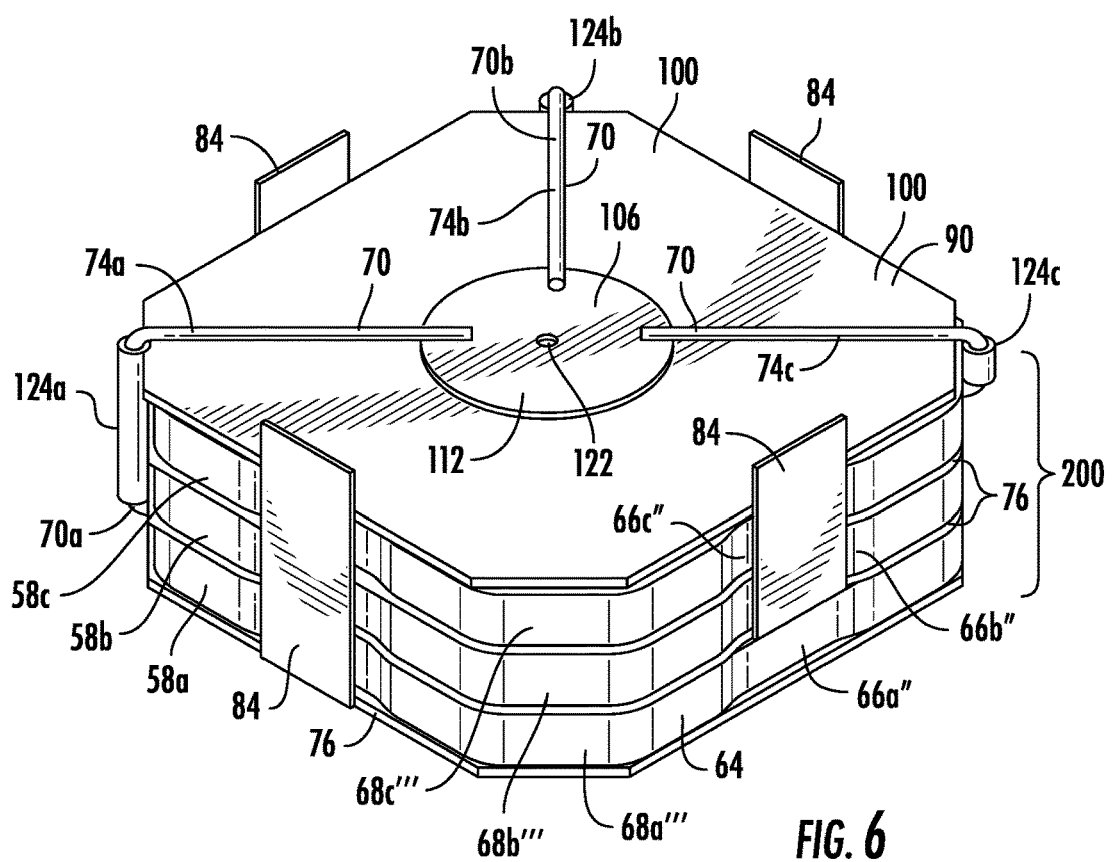
FIG. 6 shows an example of an internal arrangement of a capacitor according to an aspect of the invention, showing anode plate members, cathode assemblies, and a wire separator, from a bottom perspective view.

In an arrangement of a capacitor 10 according to aspects of the invention as shown in FIGS. 2B-2D, the first anode plate 58a preferably includes a first surface 60a arranged to be positioned adjacent the first surface 24 of the case 12, and a second surface 62a arranged to face the second surface 26 of the case 12. The first anode plate 58a preferably includes perimeter walls 64a.

Figure 8A:
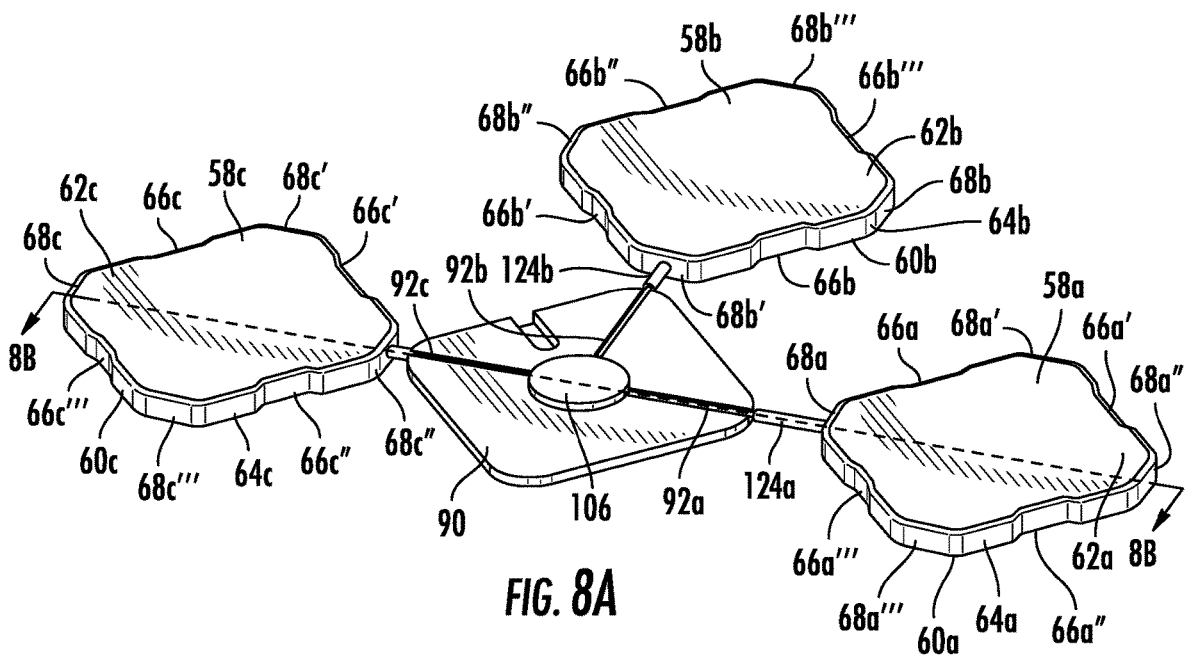
FIG. 8A shows example arrangement of anode plates connected to a wire separator and adapter plate according to an aspect of the invention.
Figure 10:
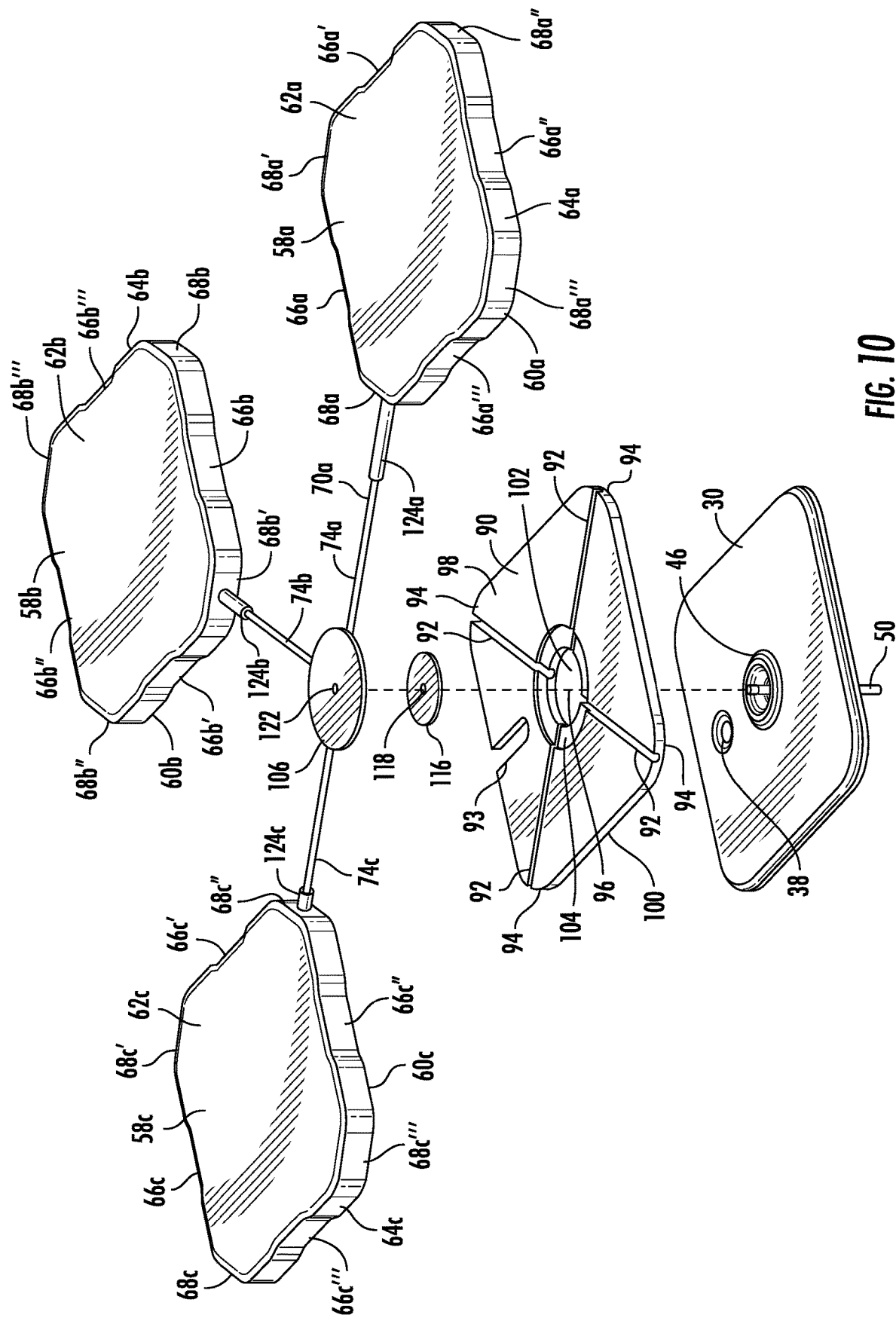
FIG. 10 shows an exploded view of an example arrangement of a first anode plate, a second anode plate, and a third anode plate connected, a wire separator, an adapter plate, a spacer plate, and a cover according to an aspect of the invention.
Figure 11:
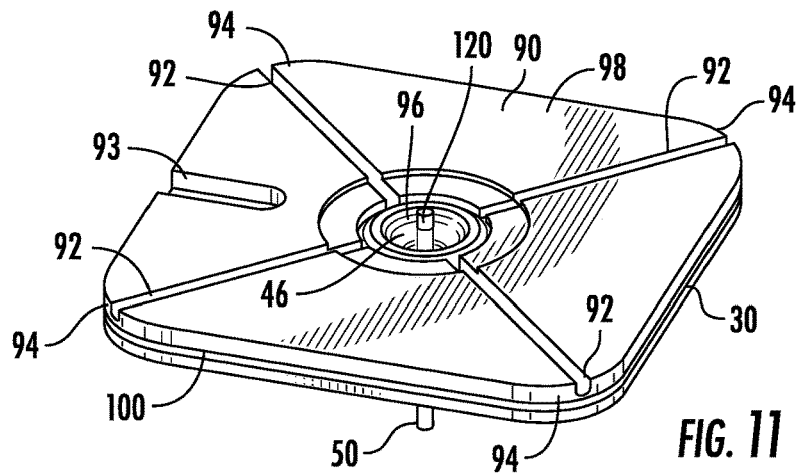
FIG. 11 shows an arrangement of a wire separator according to an aspect of the invention arranged with a cover of a capacitor according to aspects of the invention.

As shown for example in FIGS. 8A and 10, the first anode plate 58a preferably includes indentations 66a, 66a', 66a", and 66a'". The first anode plate 58a preferably includes cut-out corner portions 68a, 68a', 68a", and 68a'".

In an arrangement of a capacitor 10 according to aspects of the invention as shown in FIGS. 2B-2D, the second anode plate 58b preferably includes a first surface 60b arranged to be positioned adjacent the second surface 62a of the first anode plate 58a, and a second surface 62b arranged to face the second surface 26 of the case 12.

As shown for example in FIGS. 8A and 10, the second anode plate 58b preferably includes perimeter walls 64b. The second anode plate 58b preferably includes indentations 66b, 66b', 66b", and 66b'". The second anode plate 58b preferably includes cut-out corner portions 68b, 68b', 68b", and 68b'".

In an arrangement of a capacitor 10 according to aspects of the invention as shown in FIGS. 2B-2D, the third anode plate 58c preferably includes a first surface 60c arranged to be positioned adjacent the second surface 62b of the second anode plate 58b, and a second surface 62c arranged adjacent to and/or facing the second surface 26 of the case 12. The third anode plate 58c preferably includes perimeter walls 64c.

As shown for example in FIGS. 8A and 10, the third anode plate 58c preferably includes indentations 66c, 66c', 66c", and 66c'". The third anode plate 58c preferably includes cut-out corner portions 68c, 68c', 68c", and 68c'".

The anode plates 58 may preferably be arranged such that the indentations 66 and corner portions 68 are aligned. Such arrangements are shown for example in the FIGS. 8A and 10, showing how respective indentations 66a-66b-66c, 66a'-66b'-66c', 66a"-66b"-66c", and 66a'", 66b'", and 66c'", and corner portions 68a-68b-68c, 68a'-68b'-68c', 68a"-68b"-68c", and 68a'"-68b'"-68c'", will align. The other parts of the respective perimeter walls 64 of each anode plate 58 are also aligned in this arrangement.

When arranged accordingly, the anode plate members, along cathode assemblies 76 as will be described, may form a capacitor stack assembly 200, or capacitor stack, or capacitor assembly stack. This capacitor stack assembly 200 can be seen, for example, in FIGS. 3, 4, 5, 6, 17C, 18B, and 18D. A capacitor stack assembly arrangement is shown for example in U.S. Patent Publication No. US 2020/0020486 A1, "LOW PROFILE WET ELECTROLYTIC TANTALUM CAPACITOR," the entire contents of which is incorporated by reference as if fully set forth herein. When aligned as shown and described, for example in FIGS. 3-6, and 17C, the aligned corner portions 68 may form an angled sidewall 73 at corners of the capacitor stack assembly 200, and the aligned indentations may form an indentation channel 71 along the sidewalls 64 of the anode plates 58. As described herein, the anode plate wires may be positioned having portions extending along the angled sidewalls 73, and tabs 84 of the cathode assemblies 76 may extend along the indentation channels 71.

When the anode plates 58 of the capacitor 10 are assembled, the corner portions 68 and inner surface of the wall 14 of the case 12 may define cavities 67 providing space within the interior area of the capacitor 10. The anode plate wires 70 may extend along the spaces of the cavities 67.

While three anode plates 58 are shown and described in certain examples, it is contemplated that any number of anode plates 58 may be used for a capacitor according to aspects of the invention. For example, FIGS. 9A-9D, show arrangements of anode plates including one anode plate 58d, two anode plates 58e, 58f, three anode plates 58g, 58h, 58i, and four anode plates 58j, 58k, 58l, and 58m.

Each anode plate 58 preferable includes an anode plate wire generally designated as 70. The anode plate wire 70 may include a first portion 72 embedded in a respective anode plate 58, and a second portion 74 that is external to the anode plate 58 and extends from a wall 64 of the anode plate 58, as shown for example in FIGS. 2B-2D, 4, 6, 7A and 7B. Each anode plate wire 70 may be formed of any suitable type of material, such as tantalum, niobium, and titanium, or a suitable conductive metal. Although the anode plate wire 70 is shown with a circular cross-section, alternative implementations are possible in which the anode plate wire 70 may have another type of cross-section, such as a rectangular cross-section.

As shown for example in FIGS. 2B, 7A, 7B, 8A, 8B, 10, 12 and 13, the first anode plate 58a preferably includes first anode wire 70a, having a first portion 72a embedded in the first anode plate 58a, and a second portion 74a that is external to the first anode plate 58a. In a preferred arrangement, as shown for example in FIGS. 8A, 10, 12, 13, and 15, the second portion 74a of the first anode wire 70a extends from the corner portion 68a.

As shown for example in FIGS. 2B, 7A, 7B, 8A, 8B, 10, 12 and 13, the second anode plate 58b preferably includes second anode wire 70b, having a first portion 72b embedded in the second anode plate 58b, and a second portion 74b that is external to the second anode plate 58b. In a preferred arrangement, as shown for example in FIGS. 8A, 10, 12, 13, and 15, the second portion 74b of the second anode wire 70b extends from the corner portion 68b'.

As shown for example in FIGS. 2B, 7A, 7B, 8A, 8B, 10, 12 and 13, the third anode plate 58c preferably includes third anode wire 70c, having a first portion 72c embedded in the second anode plate 58b, and a second portion 74c that is external to the second anode plate 58b. In a preferred arrangement, as shown for example in FIGS. 8A, 10, 12, 13, and 15, the second portion 74b of the second anode wire 70b extends from corner portion 68c".

The second portions 74 of the anode plate wires 70 are preferably bent toward the cover 30 direction to run vertically along the height of the case 12, and then further bent to run horizontally across the width of the case 12. Thus, the second portions 74 of the anode plate wires 70 may have an L-shape when assembled, extending along the height of the capacitor, and along the wire separator 90, as will be described further. The entireties of the anode plate wires 70, including the first portions 72 embedded in the anode plates 58, may have a C-shape when assembled, as shown for example in FIGS. 2B and 2D.

In the arrangement of the anode plates 58 and anode wires 70 as described, each anode wire 70 have an alternating position, such that only one anode wire 70 is positioned along each set of corner portions 68, such as when forming an angled sidewall 73. Therefore, only one of the anode wires 70 is positioned along a respective corner of the cathode stack assembly 200, such that no anode plate wires 70 overlap or extend in a same part of the cavity 67.

According to aspects of the invention, in order to assist in reducing detrimental shock and vibration damage, anode wire holders, or anode wire separators, separation tubes, wire separator, or simply tubes, are provided, generally designated as 124. The anode wire holders 124 are preferably formed of polytetrafluoroethylene (PTFE), or another acceptable non-conductive material, such as a plastic or polymer. Anode wire holders 124, are preferably provided around portions of the anode plate wires 70. The anode plate wires 70 are positioned through the anode wire holders 124, such that the anode wire holders coaxially surround portions of the second portions of the anode plate wires 70, as shown for example in FIGS. 2B-2D, 8A-10, and 12-13.

The anode wire holders 124 are positioned and sized such that, when the anode plates 58 are assembled and the anode plate wires 70 are connection to the wire separator 90, the anode wire holders 124 will be positioned in the interior space or cavity 67 between the corner portions 68 of the anode plates 58 and an adjacent inner surface 130 of the wall 14 of the case 12. Preferably the anode wire holders 124 are sized having a diameter such that the outer walls of the anode wire holders 124 will be held against or contact the anode plates 58 and the inner surface 130 of the wall 14 of the case 12, as shown for example in FIGS. 2B-2D. This arrangement will securely and/or firmly hold and position the anode wire holders 124, and the portions of the anode plate wires 70 surrounding by the anode wire holders 124, preventing movement or shifting. It is appreciated that the anode wire holders may have other than a tubular shape, and may have flat walls, or a combination of round and flat walls. The anode wire holders may act as a protective sheath around portions of the anode plate wires 70.

The anode wire holders 124 are preferably sized and dimensioned such that each anode wire holder 124 will cover at least a part of the second portion 74 of each anode plate wire 70. In addition, the anode wire holders 124 are preferably sized and dimensioned such that the anode wire holder 124 surrounding the anode plate wire 70 of the anode plate 58 positioned further from the wire separator 90 will have the greatest length, and the anode wire holders 124 surrounding the anode plate wires 70 of the anode plates 58 positioned closer to the wire separator 90 will have progressively shorter lengths. Thus, as shown for example in FIGS. 2A, 2D, 7A, and 8A, the first anode wire holder 124a has a longest length that is greater than the length of second anode wire holder 124b and third anode wire holder 124c, and the second anode wire holder 124b may have a length that is greater than the third anode wire holder 124c. In this manner, the portions of the anode wire holders that extend along the side, or height, of the capacitor, are surrounded and protected by the anode wire holders.

Cathode assemblies are further provided and generally designated as 76. Each cathode assembly 76 preferably includes a cathode foil 82. The cathode foil 82 preferably comprises tantalum. The cathode foil 82 may be formed by stamping a tantalum foil and applying, for example, a palladium cathode layer thereto. However, alternative implementations are possible in which the cathode foil 82 may be formed of another suitable material such as platinum, rhodium, or their oxides, sintered tantalum, electrophoretically deposited tantalum, graphite, palladium, Ruthenium(IV) oxide (RuO2), or carbon, or any other cathode material. Further, surfaces of the cathode foil 82 and/or tabs 84 and portions of the inner surface of the case 12 may form various cathode layers. The cathode foil 82 and portions of the inner surface of the case 12 may include sintered tantalum, as described in U.S. Pat. No. 9,947,479 and U.S. Published Patent Application No. 2017/0207031 A1, the entire contents of each of which are incorporated by reference herein. The cathode foil 82 and portions of the inner surface of the case 12 may include electrophoretically deposited tantalum, as described in U.S. Pat. No. 9,070,512, the entire contents of which is incorporated by reference herein.

Each cathode assembly may further include a first separator sheet 78 and a second cathode separator sheet 80, with a cathode foil 82 sandwiched between the first separator sheet 78 and a second cathode separator sheet 80. The cathode sheets 78, 80 may be formed of polytetrafluoroethylene (PTFE) or another non-conductive and/or insulative material permeable by electrolyte. The cathode sheets 78, 80 insulate the cathode foil 82 from adjacent anode plates 58.

Each cathode assembly 76 further includes a cathode foil extension or tab 84 extending from and in electrical communication with the cathode foil 82, and extending beyond the first separator sheet 78 and a second cathode separator sheet 80. Each cathode assembly 76 may be shaped having a generally rectangular shape, with cut-out, beveled or angled corners 86. These corner portions 86 are configured to align with the corner portions 68 of the anode plates 58. The cathode tabs 84 are positioned along the side walls 88 of the cathode assemblies 76, but are preferably not positioned extending from the corners 86 or at locations where the anode plate wires 70 extend.

Figure 7A:
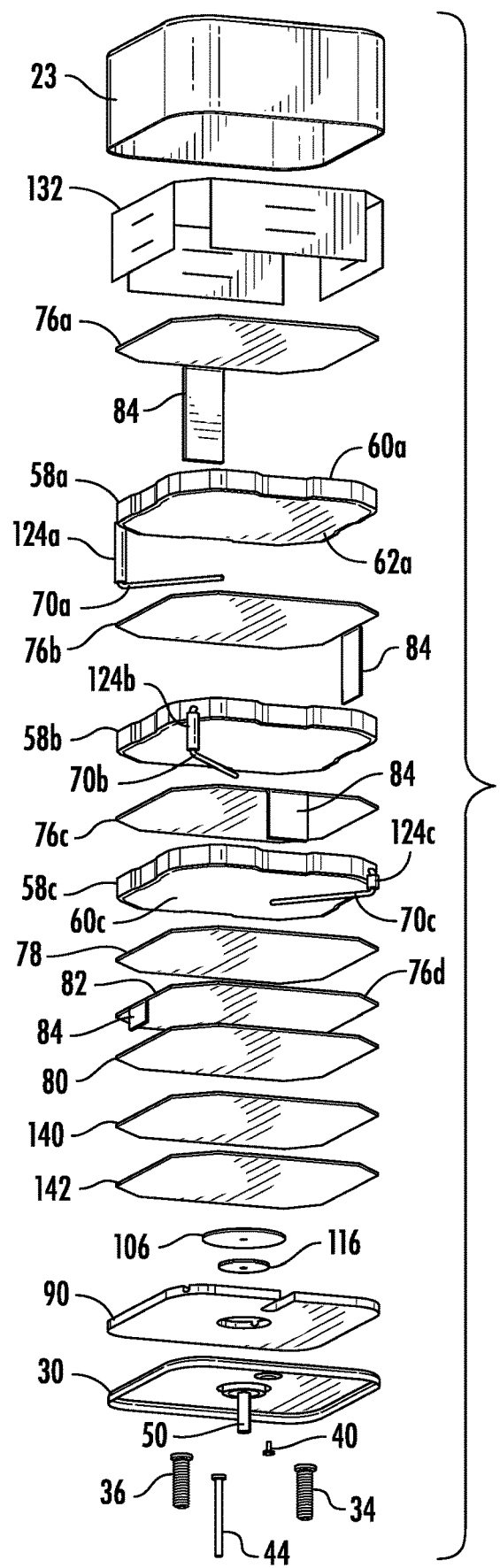
FIG. 7A shows an exploded view of a capacitor according to an aspect of the invention.
Figure 7B:
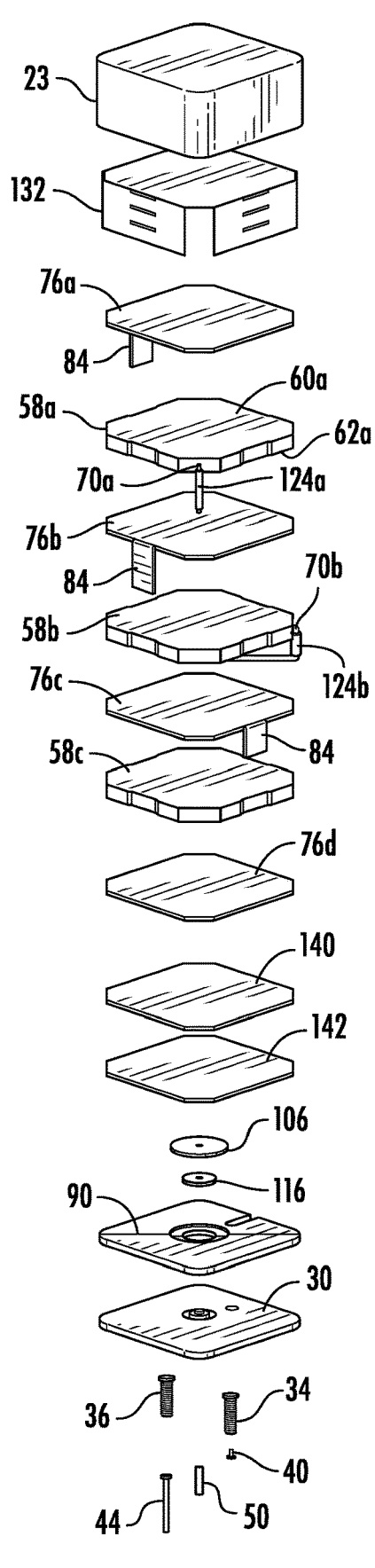
FIG. 7B shows an exploded view of a capacitor according to an aspect of the invention.

In an aspect of the invention, as shown for example in FIGS. 7A and 7B, a first cathode assembly 76a having a cathode tab 84a may be positioned adjacent the first surface 60a of the first anode plate 58a. A second cathode assembly 76b may be positioned between the first anode plate 58a and the second anode plate 58b. A third cathode assembly 76c may be positioned between the second anode plate 58b and the third anode plate 58c. A fourth cathode assembly 76d may be positioned between the second surface 60c of the third anode plate 58c and the cover 30.

It is noted that alternative implementations are possible in which the cathode assembly 76 may have any selected shape, such as a rectangular shape or a circular shape. In addition, tabs 84 may have various shapes and may extend from any selected portion of the cathode foil 82.

According to aspects of the invention, as shown for example in FIGS. 4, 6, 7A-7B, 8A, 8B, 9A-9D, 10, 11, 13, a wire separator 90 is provided. The wire separator 90 is arranged so as to gather, guide, organize and/or assemble the second portions 74 of the anode plate wires 70 to provide a collective contact area providing electrical communication with the anode lead wire 48. Further, the wire separator 90 provides for shock and vibration resistance, by preventing the anode wires from moving during shock and/or vibration, or decreasing such movement.

According to an aspect of the invention, the wire separator 90 may comprise a plate formed from polytetrafluoroethylene (PTFE). In a preferred embodiment, the wire separator includes grooves or channels 92 in a first (or upper or top) surface 98. The channels 92 are preferably positioned so as to extend or run from the wire separator 90 corners toward a central portion 96 of the wire separator 90, such corners generally designated as 94. Thus, the channels 92 may be considered as running diagonally across the first surface 98 of the wire separator 90. A groove 93 is provided in the wire separator, as shown.

As shown in FIGS. 7A-7B, 8A, 8B, 9A-9D, 10, 11, 13, each channel 92 is sized so as to receive at least part of a second portion 74 an anode plate wire 70, and to engage and hold such second portion 74 an anode plate wire 70 in alignment and/or position. Preferably, the end or terminal portions of the anode plate wires are received in the channels 92. The channels 92 may thus be sized to be at least slightly larger than a diameter of a cross-section of the anode plate wires 70.

At least one channel 92 may preferably be provided corresponding to each of the second portions 74 of the anode plate wires 70. Accordingly, as shown for example in in FIGS. 8A, 13, 16, first channel 92a is configured to receive at least a part of the second portion 74a of first anode plate wire 70a, second channel 92b is configured to receive at least a part of the second portion 74b of second anode plate wire 70b, and third channel 92c is configured to receive at least a part of the second portion 74c or third anode plate wire 70c.

The wire separator 90 is further formed with an opening 102 through the central portion 96 of the first surface 98. The opening 102 is depicted as circular, but may be another shape such as oblong, semi-circular, rectangular, or another shape. The opening 102 is further configured to receive a portion of the glass-to-metal-seal (GTMS) 46 as shown for example in FIG. 11.

Surrounding the opening 102 is a recessed area 104. As shown for example in FIGS. 10, 11 and 13, the recessed area 104 forms a step or indentation having a decreased depth adjacent the first surface 98 of the wire separator 90 and around the perimeter of the opening 102. A second surface 100 of the wire separator 90 faces the cover 30, as shown.

An adapter plate 106 formed from a conductive material is provided, preferably formed from tantalum, which may be oxidized or anodized. The adaptor plate 106 has a first surface 110 and a second (or bottom or lower) surface 112, as shown. The recessed area 104 is sized and shaped so as to receive the adapter plate 106, as shown for example in FIGS. 7B, 8B, 10, 13 and 16. The adapter plate 106 may clamp, snap or press into or otherwise mechanically engage the wire separator 90. As shown for example in FIGS. 8A, 8B, 9A-9D, and 16, parts of the second portions 74 of each anode plate wire 70 are positioned within the channels 92. The terminal ends 108 of the anode plate wires are connected or otherwise attached to the adapter plate 106, such as by welding. In a preferred embodiment, as shown for example in FIG. 15, the terminal ends 108 of the anode plate wires are connected or otherwise attached to the adapter plate 106 on a second (or bottom or lower) surface 112 of the adapter plate 106.

It is appreciated that the adapter plate 106 may be formed in any shape and may be sized as a circular plate, rectangular plate, a square plate, a triangular plate, an oblong plate, or any selected shape, so long as the anode plate wires 70 can be electrically connected to such a plate configuration in order to provide electrical communication between the anode plate wires 70 and the anode lead wire 48. When provided as a circulate plate, as shown in the Figures, the adapter plate 106 may be referred to as a "disk adapter" or "disk adapter plate." The recessed area 104 in the wire separator 90 can have a shape complimentary to any shape selected for the adapter plate 106.

A spacer plate 116 is provided. The spacer plate 116 if preferably formed from polytetrafluoroethylene (PTFE). The spacer plate 116 is sized to be received within the opening 102, and to cover and protect the glass insert 52 of the glass-to-metal-seal (GTMS) 46 as shown for example in FIGS. 2B-2D, 7A, 7B, and 10. When provided in a disk shape as shown in the Figures, the spacer may be referred to as a "spacer disk." However, it is appreciated that the spacer plate 116 may be formed in any shape and may be sized as a circular plate, rectangular plate, a square plate, a triangular plate, an oblong plate, or any selected shape, so long as the spacer plate 116 can provide a cover for the glass insert 52 of the glass-to-metal-seal (GTMS) 46. When provided as a circulate plate, as shown in the Figures, the adapter plate 106 may be referred to as a "spacer disk" or "spacer disk plate." The opening 102 in the wire separator 90 can have a shape complimentary to any shape selected for the spacer plate 116.

The spacer plate 116 preferable has a central opening 118 therethrough. A portion of the anode lead wire 48 passes through the spacer plate 116. A terminal end 120 of the anode lead wire 48 may be received in an opening 122 in the adapter plate 106 and welded to the adapter plate 106 at this position. The adapter plate 106 thereby provided the electrical connection of the anode plates wires 70 and the anode lead wire 48, so as to provide an external electrical connection to the anode plates 58.

A stack assembly separator 132 is provided configured to be placed over and around the anode plates 58 and cathode assemblies 76 that have been arranged in a capacitor stack assembly 200, a shown for example in FIGS. 7A, 7B, 18A, 18B, 18C, and 18D. The stack assembly separator 132 may be formed of polytetrafluoroethylene (PTFE) or some other non-conductive material that is permeable by an electrolyte. The stack assembly separator 132 may have a shape that is the same, similar to, or complementary to the shape of the capacitor stack assembly 200 and/or the case 12 and fits inside the case 12. The sidewalls 136 of the stack assembly separator 132 may have a height allowing the sidewalls 136 to entirely cover the sides of the capacitor stack assembly 200 to prevent the case 12 from short-circuiting the capacitor stack assembly 200. The stack assembly separator 132 preferably includes one or more slots 134 configured to receive the cathode extensions 84 and allow the cathode extensions 84 to pass through the slots 134.

Between the anode plate 58 closest to the wire separator 90 and the wire separator 90, a spacer 140 may be provided. The spacer 140 may be formed of polytetrafluoroethylene (PTFE). The spacer 140 may include an adhesive such as a tape on a surface of the spacer 140, for attachment to surfaces of adjacent components.

Between the spacer 140 and the wire separator, a gasket 142 is preferably provided. The gasket 142 may preferably be formed from Viton™ fluoroelastomer or a similar material, and may assist in providing anti-vibration, shock absorption and stability properties to the capacitor 10. The gasket 142 may also be formed with an opening to receive a portion of the anode lead wire 48 which may be referred to as a riser wire, to provide further stability to this attachment.

Figure 19:
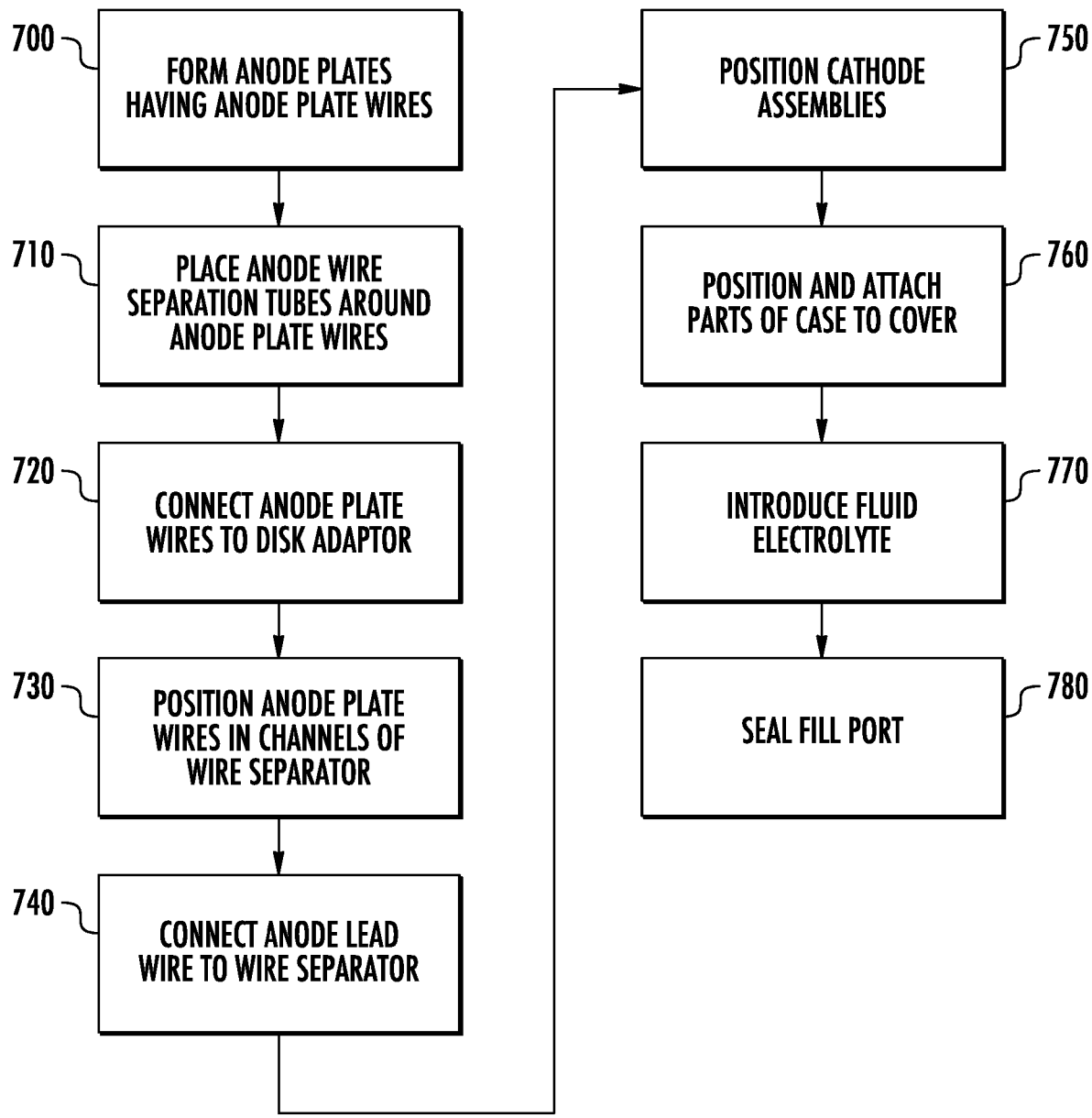

Forming and/or manufacturing a capacitor 10 according to aspects of the invention will not be described, with reference to the flow chart of FIG. 19, and the additional Figures indicated depicting various stages of the manufacturing process. It is noted that one or more steps may be combined, that certain steps may be omitted, and that the steps may be performed in any preferred order as desired.

Figure 12:
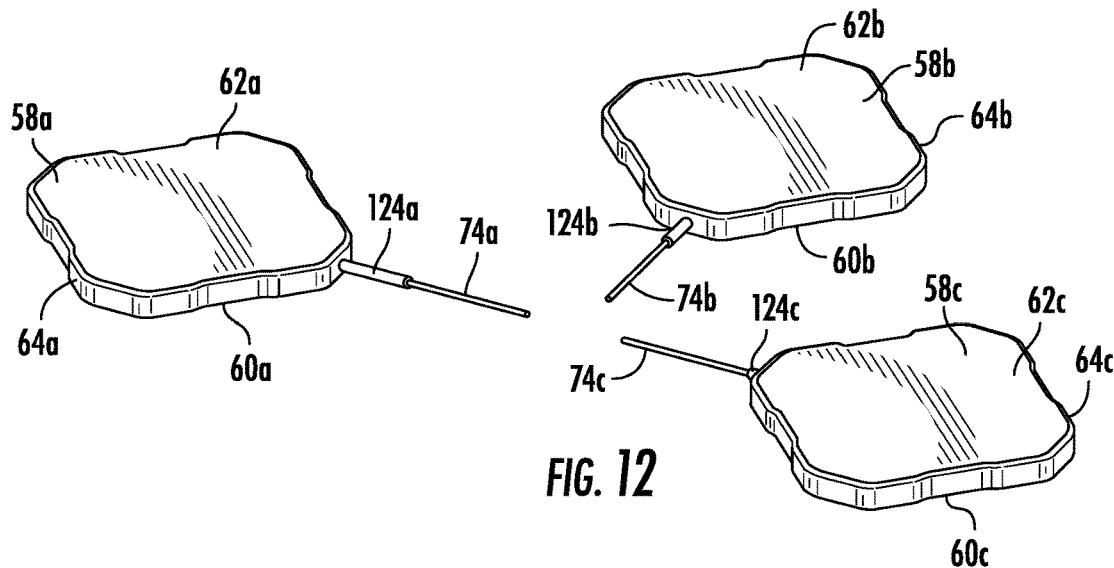
FIG. 12 shows an arrangement of anode plate members, anode plate wires, and anode wire holders, according to aspects of the invention.
Figure 13:
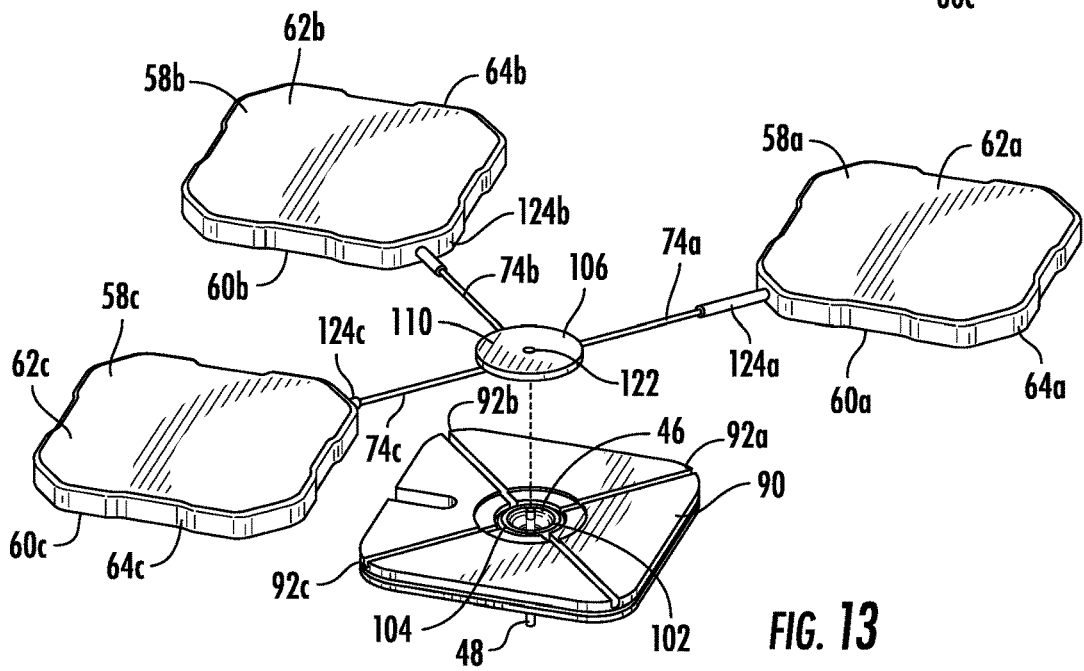
FIG. 13 shows an arrangement of anode plate members according to aspects of the invention connected to adapter plate, positioned for alignment with a wire separator according to aspects of the invention.

At step 700, anode plates 58 are formed. As shown in FIG. 12, in an example arrangement, a first anode plate 58a is formed having an embedded first anode plate wire 70a, a second anode plate 58b is formed having an embedded second anode plate wire 70b, and a third anode plate 58c is formed having an embedded third anode plate wire 70c.

It should be noted that the lengths of the anode plate wires 70 are formed and/or otherwise sized such that the anode plate wire 70 extending from an anode plate 58 to be positioned furthest from the wire separator 90 when assembled will have a longest length, so as to reach the wire separator 90, while those anode plates 58 to be positioned closer to the wire separator 90 will have progressively shorter anode plate wires 70.

For example, as shown in FIGS. 2B, 2D, 7A, and 8A, in order to reach and contact the adapter plate 106, anode plate wire 70a, being furthest from the adapter plate 106, has a length greater than the length of anode plate wire 70b and anode plate wire 70c, and anode plate wire 70b has a length greater than anode plate wire 70c.

At step 710, the anode wire holders 124 are placed around parts of the second portions 74 of the anode plate wires 70. This is shown for example in FIGS. 12, 13, 15, and 16.

Figure 15:
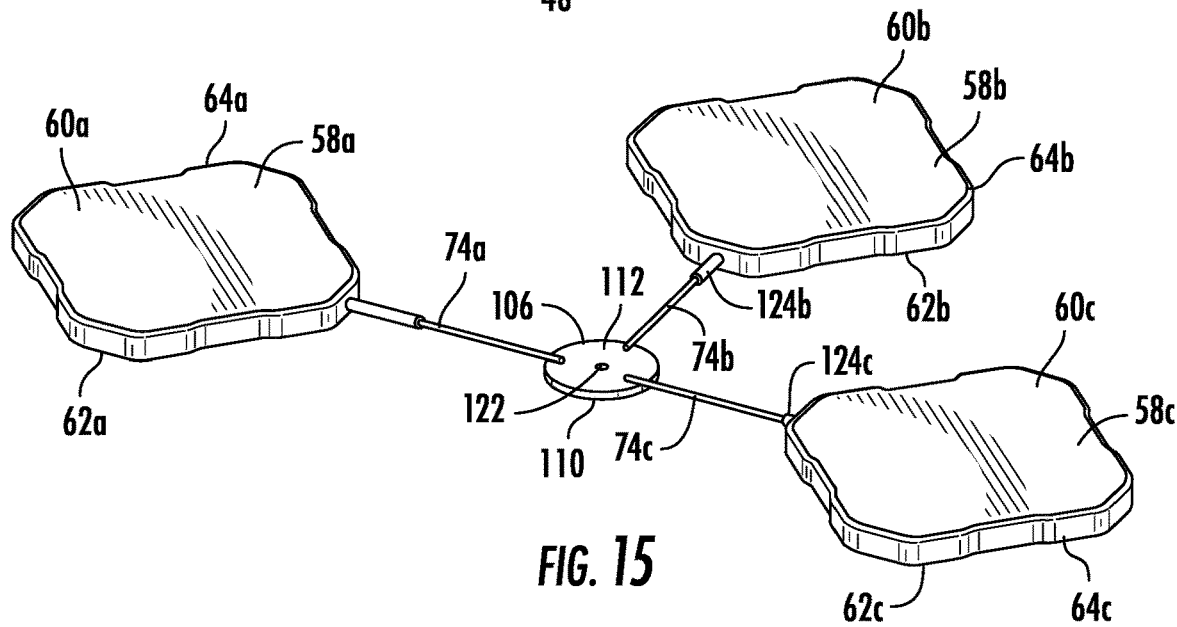
FIG. 15 shows an arrangement of anode plate members connected to an adapter plate according to aspects of the invention.

At step 720 the anode plate wires are connected to the wire separator 90, such as by welding. As shown in FIG. 15, the second portion 74a of the first anode plate wire 70a is welded to a surface of the wire separator 90, the second portion 74b of the second anode plate wire 70b is welded to a same surface of the wire separator 90, and the second portion 74c of the third anode plate wire 70c is welded to a same surface of the wire separator 90. Preferably, the surface of the wire separator 90 to which the anode plate wires 70 are attached is the surface that will ultimately face the cover 30. This is shown for example in FIGS. 10, 13, 15, and 16.

Figure 8B:
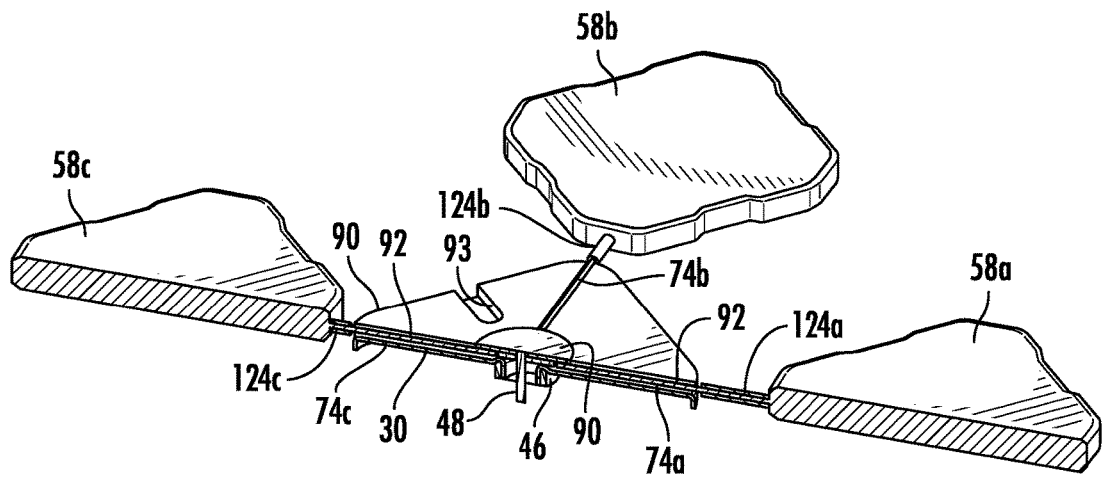
FIG. 8B shows a cross-sectional view of the arrangement of FIG. 8A, taken along line 8B-8B of FIG. 8A.
Figure 9A:
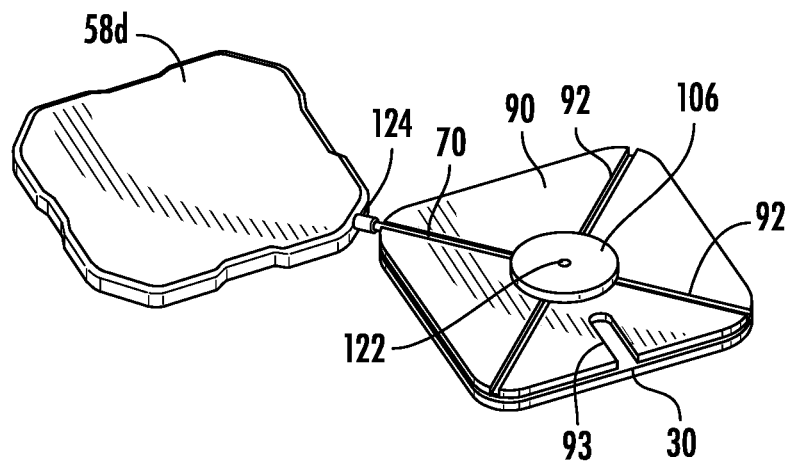
FIG. 9A shows an example arrangement of a single anode plate design connected to a wire separator and adapter plate according to an aspect of the invention.
Figure 9B:
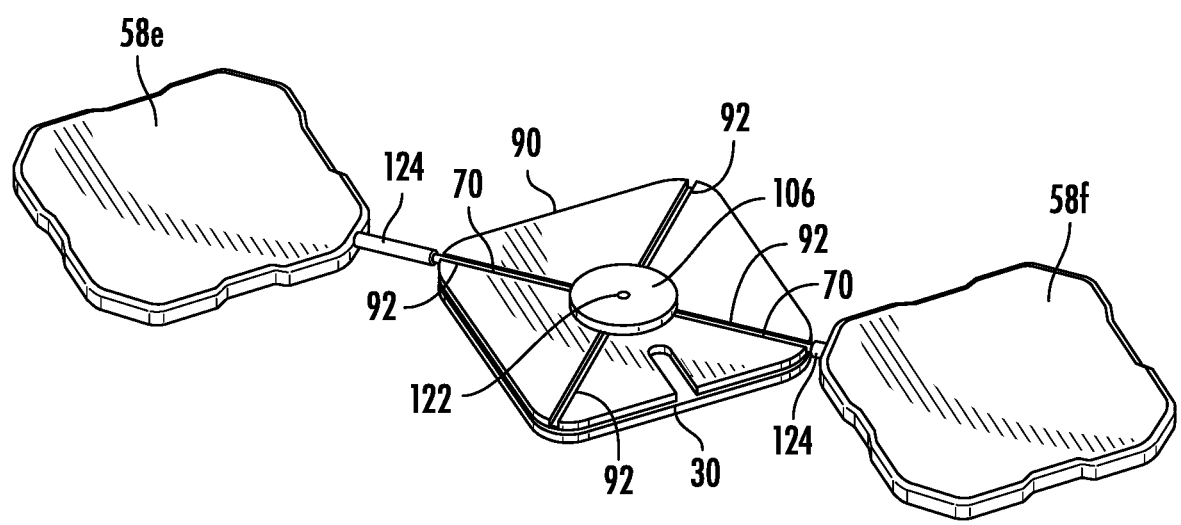
FIG. 9B shows an example arrangement of a double anode plate design connected to a wire separator and adapter plate according to an aspect of the invention.
Figure 9C:
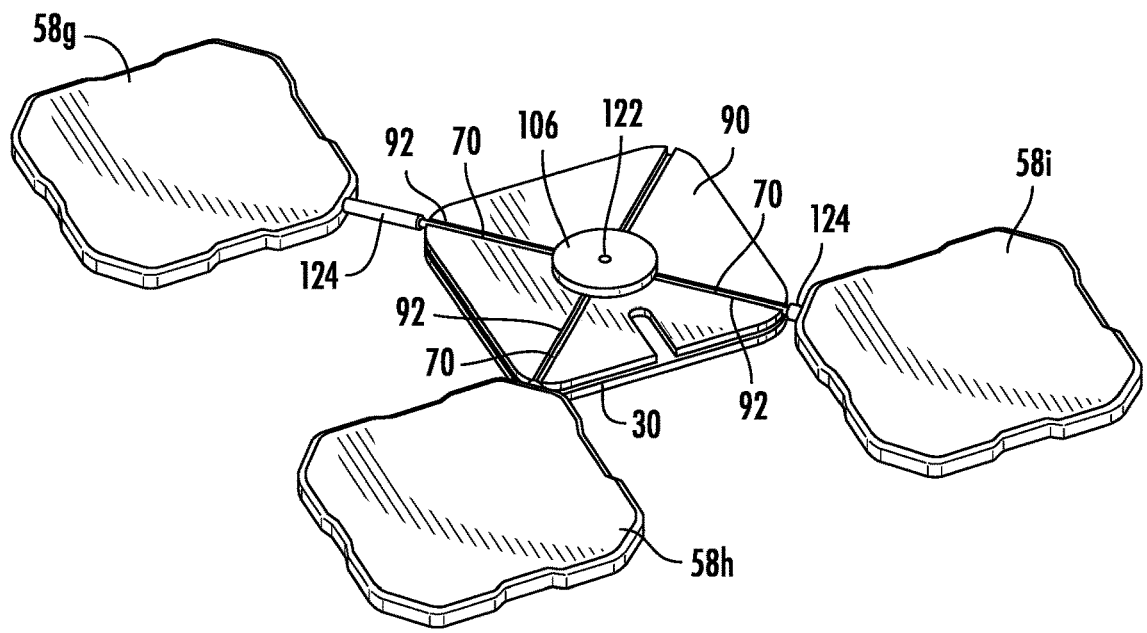
FIG. 9C shows an example arrangement of a triple anode plate design connected to a wire separator and adapter plate according to an aspect of the invention.
Figure 9D:
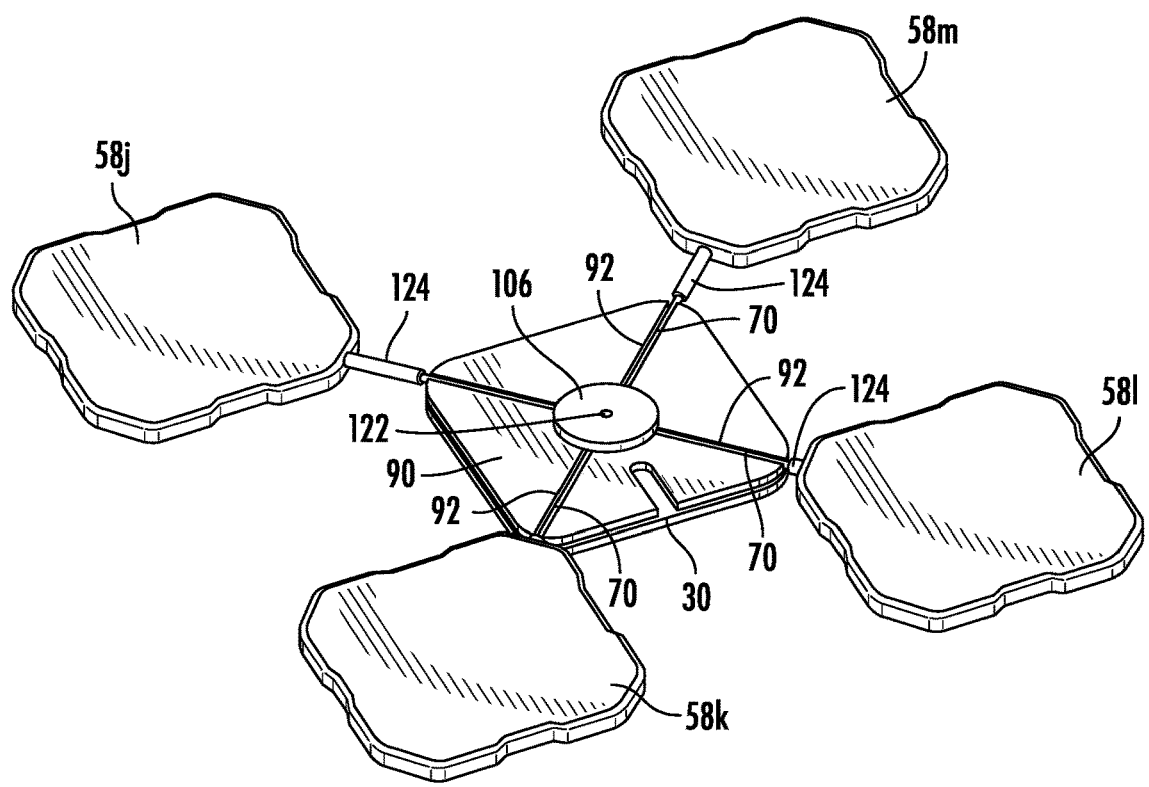
FIG. 9D shows an example arrangement of a quadruple anode plate design connected to a wire separator and adapter plate according to an aspect of the invention.
Figure 16:
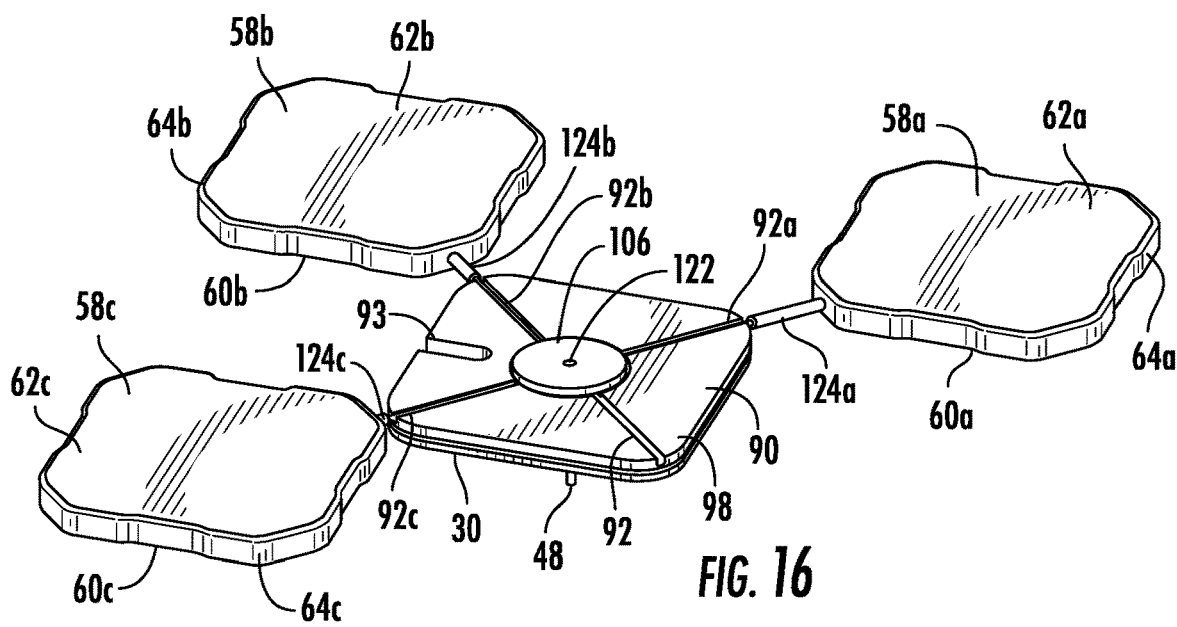
FIG. 16 shows an arrangement of anode plate members connected to an adapter plate, positioned on the wire separator as shown in FIG. 15, according to aspects of the invention.

At step 730, and as shown for example in FIGS. 8A, 8B, and 16, parts of the second portions 74 of the anode plate wires 70 are inserted into the channels 92 of the wire separator 90.

Figure 14:
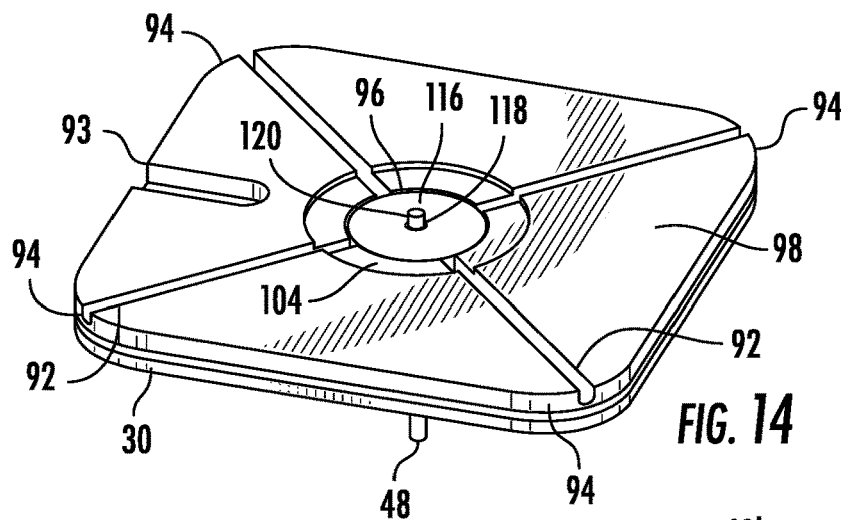
FIG. 14 shows an arrangement of a wire separator of the invention arranged with a cover of a capacitor according to aspects of the invention, showing a spacer plate in position on the wire separator.

At step 740, the anode lead wire 48 is positioned through the adapter plate 106 and inserted into the opening 102 in the wire separator 90, and connected, such as by welding, to the wire separator 90. This is shown for example in FIGS. 14 and 16.

At this stage, the capacitor assembly according to aspects of the invention as shown for example in FIG. 16, including the cover 30, anode plates 58, anode wires 70, and wire separator 90, is a unique and novel arrangement that can be used with various capacitor arrangements and cases, in a manner so as to prevent shock and vibration.

Figure 17A:
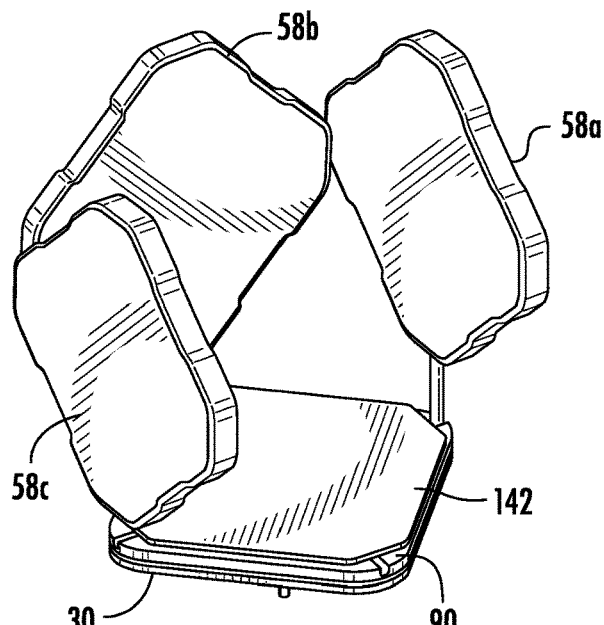
FIG. 17A shows the arrangement of FIG. 16, with the anode plates bent for positioning, and with a gasket positioned on a wire separator.
Figure 17B:
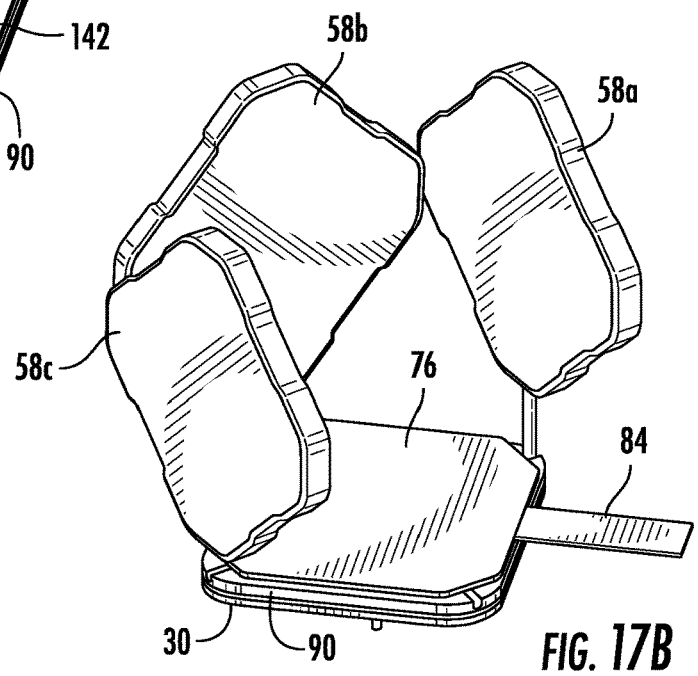
FIG. 17B shows the arrangement of FIG. 16, with a cathode assembly positioned for assembly.
Figure 17C:
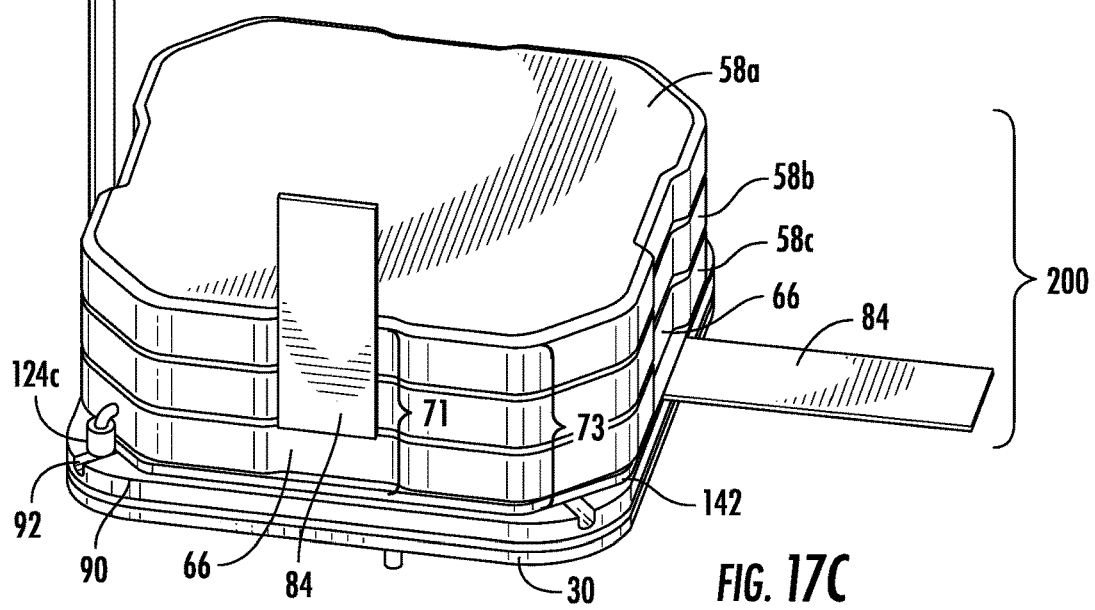
FIG. 17C shows the arrangement of a cathode stack assembly according to aspects of the invention, with cathode assemblies inserted between the anode plates, showing an arrangement of cathode tabs.

At step 750, the cathode assemblies 76 are positioned so as to be interleaved or placed between adjacent anode plates 58, forming the capacitor stack assembly 200. The cathode extensions or cathode tabs 84 are positioned so as to align with the indentations 66 of the anode plates 58. The cathode tabs 84 are electrically coupled to the cover 30 and/or the case 12. When the cover 30 and case 12 are connected, the case 12 may form part of the cathode of the capacitor 10. The cathode tabs 84 may be spot welded to the cover 30 via a weld. It may be appreciated that the description of elements in contact with or directly coupled does not preclude the presence of solder or some other form of adhesive or attachment element between the elements that are described as in direct contact or directly coupled. This is shown for example in FIGS. 17A, 17B, and 17C.

Additional cathode assemblies 76 may be positioned between the wire separator and the second surface 26 of the lower-most anode plate 58c, and/or between the first surface 24 of the upper-most anode plate 58a and the first side 16 of the case 12

Figure 18A:
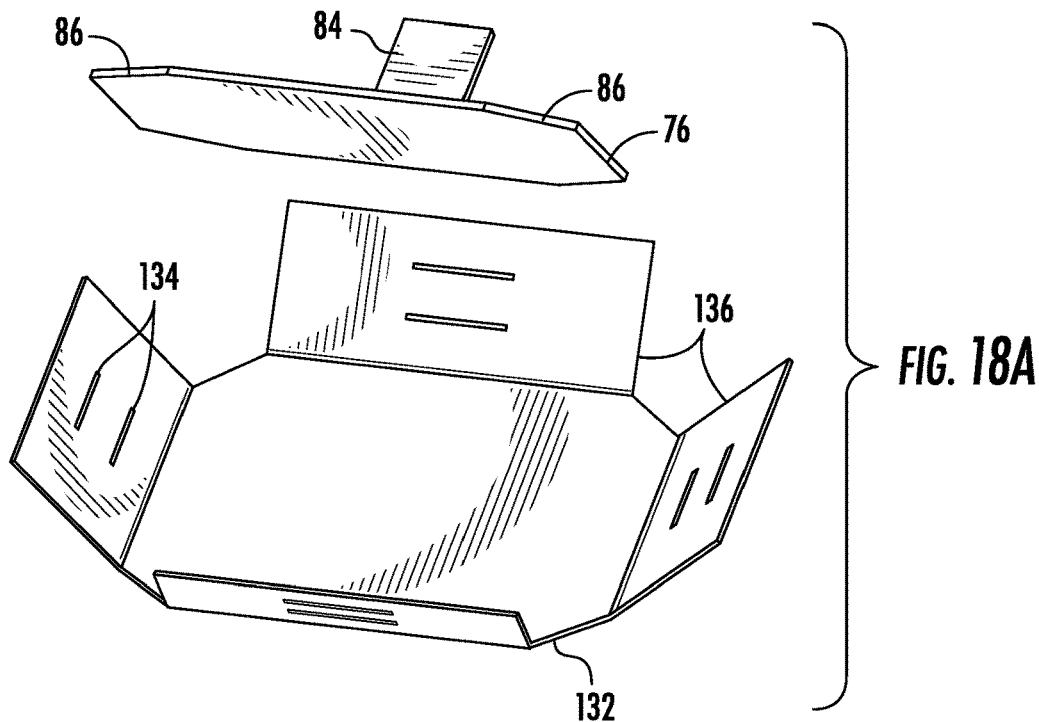
FIG. 18A shows a stack assembly separator according to an aspect of the invention and a cathode assembly positioned for arrangement with the stack assembly separator.
Figure 18B:
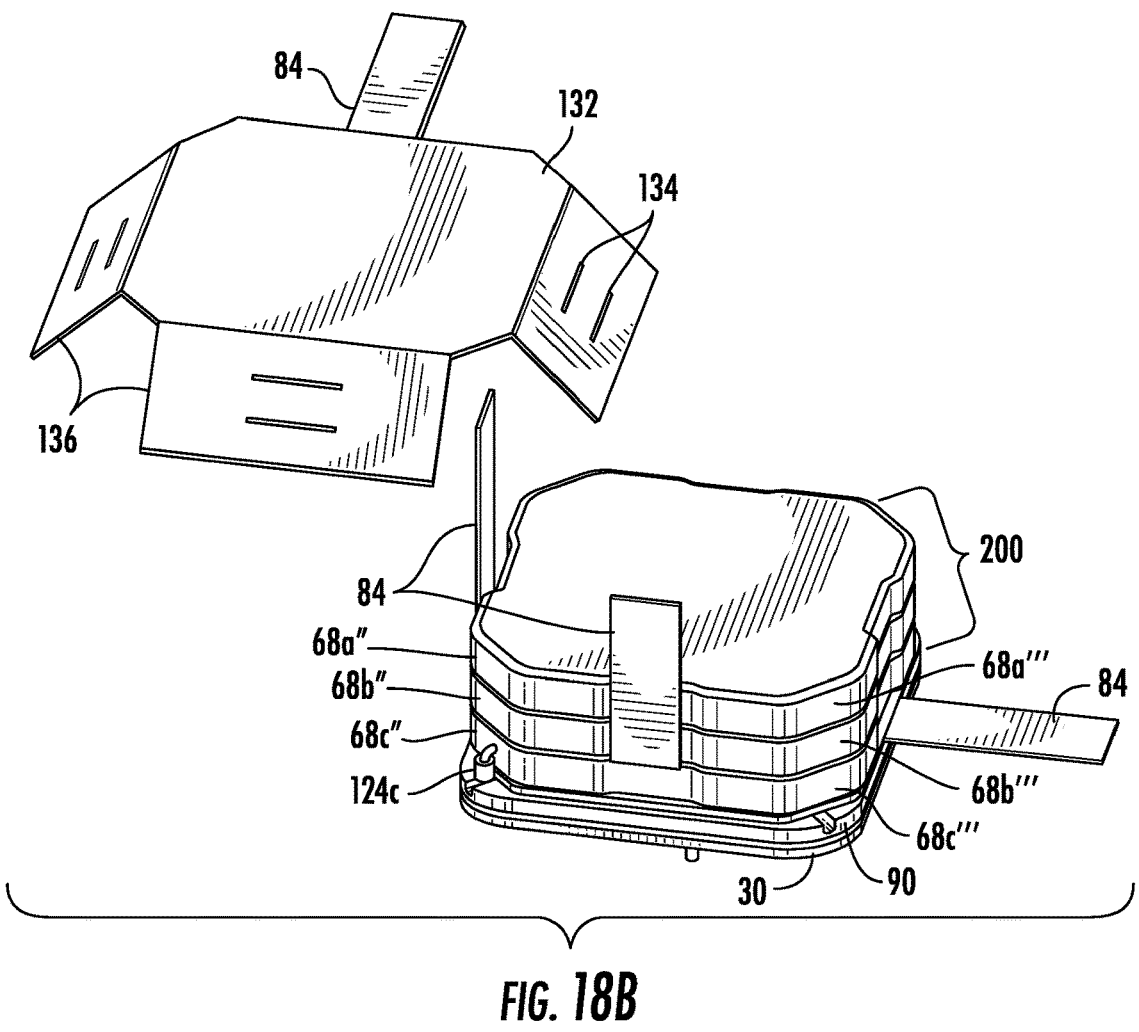
FIG. 18B shows a stack assembly separator according to an aspect of the invention with a cathode assembly arranged with the stack assembly separator, and positioned for further assembly with a cathode stack assembly according to aspects of the invention.
Figure 18C:
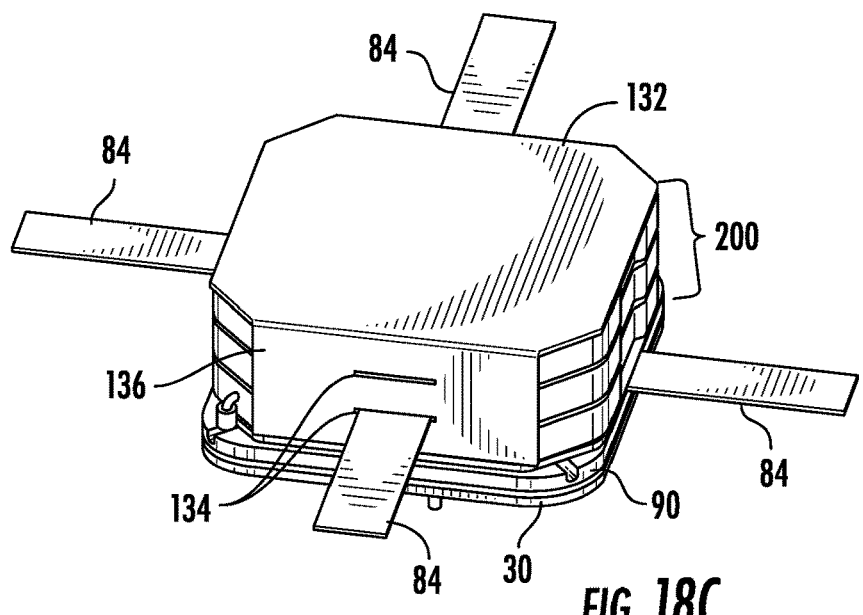
FIG. 18C shows a stack assembly separator according to an aspect of the invention arranged over a cathode stack assembly according to aspects of the invention, with cathode assembly tabs arranged through slots in the stack assembly separator.
Figure 18D:
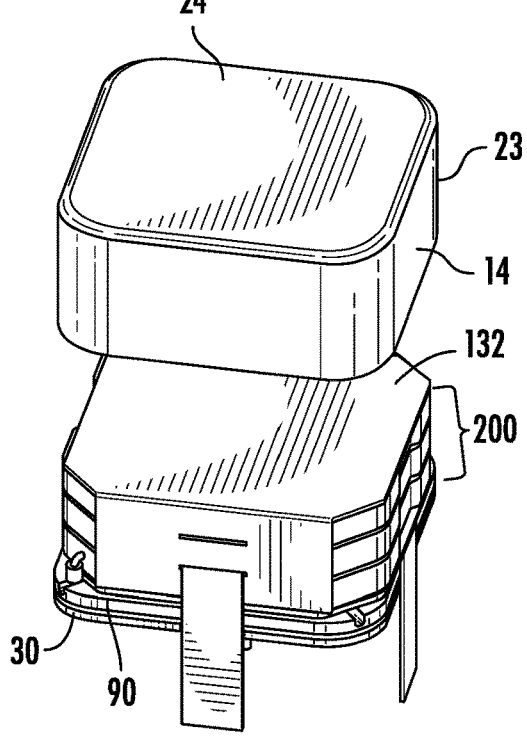
FIG. 18D shows a first portion of a capacitor case according to aspect of the invention positioned for arrangement over a cathode stack assembly.

As the cathode assemblies 76 are positioned, and as shown for example in FIGS. 18A, 18B and 18C, the cathode tabs 84 are positioned through the slots 134 in the sidewalls 136 of the stack assembly separator 132. In this manner, the cathode tabs 84 cannot contact the capacitor stack assembly 200 and short out the device. The cathode tabs 84 are bent toward the cover 30.

Figure 18E:
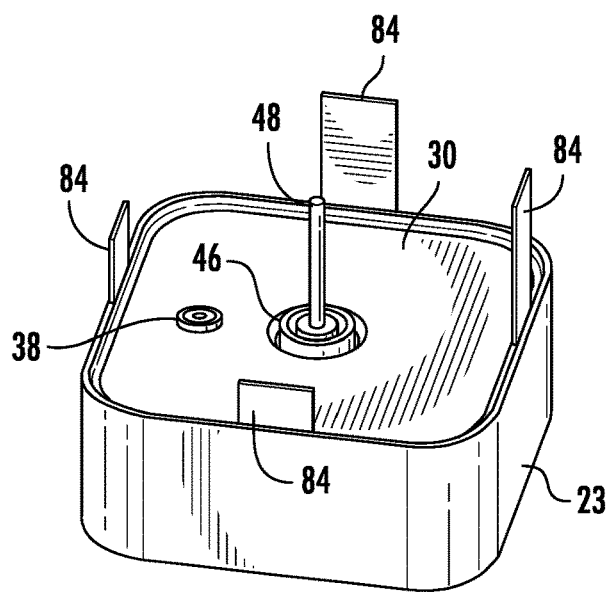
FIG. 18E shows a sealed capacitor case with capacitor assembly tabs extending from the case; and, FIG. 19 shows a flow chart with an example of a process of forming a capacitor according to aspects of the invention.

At step 760, the first portion 23 of the case 12 is placed over the internal components of the capacitor 10, and attached to the cover 30, such as via welding. This is shown for example in FIGS. 18D and 18E. The external portions of the tabs 84 may preferably be trimmed. The first portion 23 of the case 12 and tabs 84 may all be attached via welding.

At step 770, a fluid electrolyte is introduced into the interior area of the case through the fill port 38.

At step 780, the fill port 38 is sealed, such as by a plug 40 or tantalum ball.

Although the features and elements of the present invention are described in the example aspects and/or embodiments in particular combinations, each feature may be used alone without the other features and elements of the example aspects and/or embodiments or in various combinations with or without other features and elements of the present invention. The foregoing descriptions of specific aspects and/or embodiments of the present technology have been presented for purposes of illustration and description. They are not intended to be exhaustive or to limit the invention to the precise forms disclosed, and obviously many modifications and variations are possible in light of the above teaching. The aspects and/or embodiments were chosen and described in order to best explain the principles of the present technology and its practical application, to thereby enable others skilled in the art to best utilize the present technology and various aspects and/or embodiments with various modifications as are suited to the particular use contemplated. It is intended that the scope of the invention be defined by the claims appended hereto and their equivalents.

It will be appreciated by persons skilled in the art that the present invention is not limited by what has been particularly shown and described hereinabove. Rather the scope of the present invention includes both combinations and sub-combinations of various features described herein as well as modifications thereof which are not in the prior art.

What is claimed is:

1. A capacitor assembly comprising:
   a case defining an interior area;
   an anode plate positioned within the interior area, the anode plate having an anode plate wire extending from a surface of the anode plate;
   an anode wire holder positioned within the interior area and positioned around at least a portion of the anode plate wire, the anode wire holder positioned between a wall of the anode plate and an inner surface of a wall of the case;
   a wire separator positioned within the interior area and comprising a channel, at least a portion of the anode plate wire received within the channel.

2. The capacitor assembly of claim 1, further comprising a second anode plate, the second anode plate positioned within the interior area adjacent the anode plate, the second anode plate having a second anode plate wire extending from a surface of the second anode plate;
   a second anode wire holder positioned within the interior area and positioned around at least a portion of the second anode plate wire, the second anode wire holder positioned between a wall of the second anode plate and the inner surface of the wall of the case;
   the wire separator further comprising a second channel, at least a portion of the second anode plate wire received within the channel; and
   cathode assembly positioned within the interior area between the anode plate and the second anode plate and insulated from the anode plate and the second anode plate, the cathode assembly in electrical communication with the case.

3. The capacitor assembly of claim 1, wherein the wire separator further comprises a recessed area, and further comprising an adapter plate positioned within the recessed area, wherein at least a portion of the anode plate wire is attached to the adapter plate.

4. The capacitor assembly of claim 3, wherein the case comprises a cover, and wherein a glass-to-metal-seal (GTMS) is provided in the cover, and further comprising an anode lead wire positioned through the glass-to-metal-seal (GTMS), the anode lead wire in electrical contact with the adapter plate.

5. The capacitor assembly of claim 1, wherein the anode wire holder comprises a non-conductive tube.

6. The capacitor assembly of claim 1, wherein the anode wire holder contacts the wall of the anode plate at a first position, and contacts the inner surface of the wall of the case at a second position.

7. The capacitor assembly of claim 1, further comprising at least one cathode assembly positioned within the interior area adjacent to the anode plate and insulated from the anode plate, the cathode assembly in electrical communication with the case.

8. A capacitor comprising:
a case defining an interior area, the case comprising a cover;
a plurality of anode plates arranged in a stack comprising at least two adjacent anode plates, each of the plurality of anode plates comprising an anode plate wire, at least a portion of each of the anode plate wires surrounded by an anode wire holder, each of the anode wire holders positioned between at least one of the plurality of anode plates and an inner surface of the case, the plurality of anode plates, the anode plate wires, and the anode wire holders positioned within the interior area;
a cathode assembly positioned within the interior area and insulated from the plurality of anode plates, the cathode assembly positioned between the adjacent anode plates of the plurality of anode plates, the cathode assembly in electrical communication with the case;
a wire separator positioned in the interior area and comprising a plurality of channels, at least a portion of each of the anode plate wires received within at least one of the plurality of channels;
an adapter plate positioned on the wire separator, wherein at least a portion of each of the anode plate wires is attached to the adapter plate;
an anode lead wire extending through the case and isolated from the case, the anode lead wire in electrical contact with the adapter plate; and
a fluid electrolyte contained within the case.

9. The capacitor of claim 8, wherein the wire separator further comprises a recessed area, and wherein the adapter plate is positioned within the recessed area.

10. The capacitor of claim 8, further comprising a glass-to-metal-seal (GTMS) provided in the cover, wherein the anode lead wire is isolated from the case by the glass-to-metal-seal (GTMS).

11. The capacitor of claim 8, wherein the anode wire holder comprises a tube.

12. The capacitor of claim 11, wherein the anode wire holder contacts at least a portion of the anode plates at a first position, and wherein the anode wire holder contacts an inner surface of a wall of the case at a second position.

13. The capacitor of claim 12, wherein walls of each of the plurality of anode plates form an angled sidewall forming a cavity between the angled sidewall and the inner surface of the wall of the case, and wherein the anode wire holder is positioned within the cavity.

* * * * *